United States Patent
Ishige et al.

(10) Patent No.: US 12,470,040 B2
(45) Date of Patent: Nov. 11, 2025

(54) LIGHT EMITTING APPARATUS, LIGHT SOURCE UNIT, LIGHT SOURCE APPARATUS, AND OPTICAL FIBER LASER

(71) Applicant: FURUKAWA ELECTRIC CO., LTD., Tokyo (JP)

(72) Inventors: Yuta Ishige, Tokyo (JP); Gabor Gajdatsy, Budapest (HU); Masaya Nakazumi, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 780 days.

(21) Appl. No.: 17/804,924

(22) Filed: Jun. 1, 2022

(65) Prior Publication Data
US 2022/0294174 A1  Sep. 15, 2022

Related U.S. Application Data

(63) Continuation of application No. PCT/JP2020/045326, filed on Dec. 4, 2020.

(30) Foreign Application Priority Data

Dec. 6, 2019 (JP) .................................. 2019-221501

(51) Int. Cl.
*H01S 3/30* (2006.01)
*H01S 3/067* (2006.01)
(Continued)

(52) U.S. Cl.
CPC .......... *H01S 5/02326* (2021.01); *H01S 3/067* (2013.01); *H01S 3/094049* (2013.01);
(Continued)

(58) Field of Classification Search
CPC ................. H01S 5/02326; H01S 3/067; H01S 3/094049; H01S 3/094053; H01S 5/005;
(Continued)

(56) References Cited

U.S. PATENT DOCUMENTS 6,873,640 B2  3/2005  Bradburn et al.
8,395,133 B2  3/2013  Moriya et al.
(Continued)

FOREIGN PATENT DOCUMENTS

JP  53-71589  6/1978
JP  60-130661 U  9/1985
(Continued)

OTHER PUBLICATIONS

International Search Report issued Feb. 22, 2021 in PCT/JP2020/045326, filed on Dec. 4, 2020, 3 pages.
(Continued)

*Primary Examiner* — Kinam Park
(74) *Attorney, Agent, or Firm* — Oblon, McClelland, Maier & Neustadt, L.L.P.

(57) ABSTRACT

A light emitting apparatus includes: a light emitting element configured to emit laser light; a case configured to house the light emitting element, and including a window configured to allow transmittance of the laser light emitted from the light emitting element; a first optical element provided outside the case and configured to converge, in a fast axis direction, the laser light passing through the window; and a second optical element configured to collimate the laser light input via the first optical element, in the fast axis direction, in a state where a beam width in the fast axis direction is narrower than a beam width in the fast axis direction on an incident surface of the first optical element, the second optical element being located closer to the first optical element than a convergence point of the laser light in the fast axis direction by the first optical element.

21 Claims, 16 Drawing Sheets

(51) Int. Cl.
  *H01S 3/094* (2006.01)
  *H01S 5/00* (2006.01)
  *H01S 5/02253* (2021.01)
  *H01S 5/02326* (2021.01)
  *H01S 5/40* (2006.01)
  *G02B 19/00* (2006.01)
  *G02B 27/30* (2006.01)

(52) U.S. Cl.
  CPC ........ *H01S 3/094053* (2013.01); *H01S 5/005* (2013.01); *H01S 5/02253* (2021.01); *H01S 5/4012* (2013.01); *G02B 19/0052* (2013.01); *G02B 27/30* (2013.01); *H01S 3/0675* (2013.01); *H01S 3/09408* (2013.01); *H01S 5/4031* (2013.01)

(58) Field of Classification Search
  CPC .. H01S 5/02253; H01S 5/4012; H01S 3/0675; H01S 3/09408; H01S 5/4031; H01S 3/09415; H01S 5/0071; H01S 5/02208; H01S 5/02251; H01S 2301/02
  See application file for complete search history.

(56) References Cited

U.S. PATENT DOCUMENTS

| | | | |
|---|---|---|---|
| 8,698,114 B2 | 4/2014 | Moriya et al. | |
| 10,109,978 B2 | 10/2018 | Kanskar et al. | |
| 10,243,320 B2 | 3/2019 | Kanskar et al. | |
| 10,261,261 B2 | 4/2019 | Hemenway et al. | |
| 10,564,361 B2 | 2/2020 | Hemenway et al. | |
| 10,777,965 B2 | 9/2020 | Ishige et al. | |
| 10,862,265 B2 | 12/2020 | Kanskar et al. | |
| 11,579,384 B2* | 2/2023 | Omori | B23K 26/0608 |
| 2002/0054428 A1* | 5/2002 | Seward | G02B 6/4225 359/210.1 |
| 2003/0142720 A1 | 7/2003 | Bradburn et al. | |
| 2007/0237455 A1* | 10/2007 | Sonoda | G02B 6/4206 385/33 |
| 2010/0078577 A1 | 4/2010 | Moriya et al. | |
| 2013/0148677 A1 | 6/2013 | Moriya et al. | |
| 2017/0235057 A1 | 8/2017 | Hemenway et al. | |
| 2017/0358900 A1 | 12/2017 | Kanskar et al. | |
| 2018/0031850 A1* | 2/2018 | Jiang | H01S 5/0071 |
| 2018/0278013 A1 | 9/2018 | Kanskar et al. | |
| 2019/0052050 A1 | 2/2019 | Kanskar et al. | |
| 2019/0157835 A1 | 5/2019 | Ishige et al. | |
| 2019/0212497 A1 | 7/2019 | Hemenway et al. | |
| 2020/0244037 A1* | 7/2020 | Omori | H01S 5/005 |

FOREIGN PATENT DOCUMENTS

| | | |
|---|---|---|
| JP | 61-53960 U | 4/1986 |
| JP | 2003-294991 A | 10/2003 |
| JP | 2004-6641 A | 1/2004 |
| JP | 2007-199657 A | 8/2007 |
| JP | 2010-186735 A | 8/2010 |
| JP | WO 2018/043752 A1 | 3/2018 |
| JP | 2019-184729 A | 10/2019 |
| JP | 2020-87988 A | 6/2020 |

OTHER PUBLICATIONS

Japanese Office Action issued Aug. 2, 2022 in Japanese Patent Application No. 2021-562759 (with unedited computer generated English translation), 12 pages.

* cited by examiner

LIGHT EMITTING APPARATUS, LIGHT SOURCE UNIT, LIGHT SOURCE APPARATUS, AND OPTICAL FIBER LASER

This application is a continuation of International Application No. PCT/JP2020/045326, filed on Dec. 4, 2020 which claims the benefit of priority of the prior Japanese Patent Application No. 2019-221501, filed on Dec. 6, 2019, the entire contents of which are incorporated herein by reference.

BACKGROUND

The present disclosure relates to a light emitting apparatus, a light source unit, a light source apparatus, and an optical fiber laser.

Heretofore, there has been known a light emitting apparatus including: a light emitting element having a fast axis and a slow axis; a lens that collimates light in a fast axis direction; and a lens that collimates light in a slow axis direction, in which light emitted from the light emitting element is collimated in the fast axis direction, and is thereafter collimated in the slow axis direction (for example, refer to US 2018/0031850 A1).

SUMMARY

In such a configuration in which the light emitting element is housed in a hermetically sealed case, and the lens that collimates the light in the fast axis direction is disposed outside the case, the light from the light emitting element is collimated in a state of being expanded at a relatively large angle in the fast axis direction, and therefore, there has been a problem that a beam width in the fast axis direction increases.

There is a need for a light emitting apparatus, a light source unit, a light source apparatus, and an optical fiber laser, which are capable of further reducing a beam diameter, for example, in a configuration in which a light emitting element is housed in a case, and a lens that collimates light emitted from the light emitting element is provided outside the case.

According to one aspect of the present disclosure, there is provided a light emitting apparatus including: a light emitting element having a fast axis and a slow axis, the light emitting element being configured to emit laser light; a case configured to house the light emitting element, the case including a window configured to allow transmittance of the laser light emitted from the light emitting element; a first optical element provided outside the case and configured to converge, in a fast axis direction, the laser light passing through the window; and a second optical element configured to collimate the laser light input via the first optical element, in the fast axis direction, in a state where a beam width in the fast axis direction is narrower than a beam width in the fast axis direction on an incident surface of the first optical element, the second optical element being located closer to the first optical element than a convergence point of the laser light in the fast axis direction by the first optical element.

DETAILED DESCRIPTION

Figure 1:
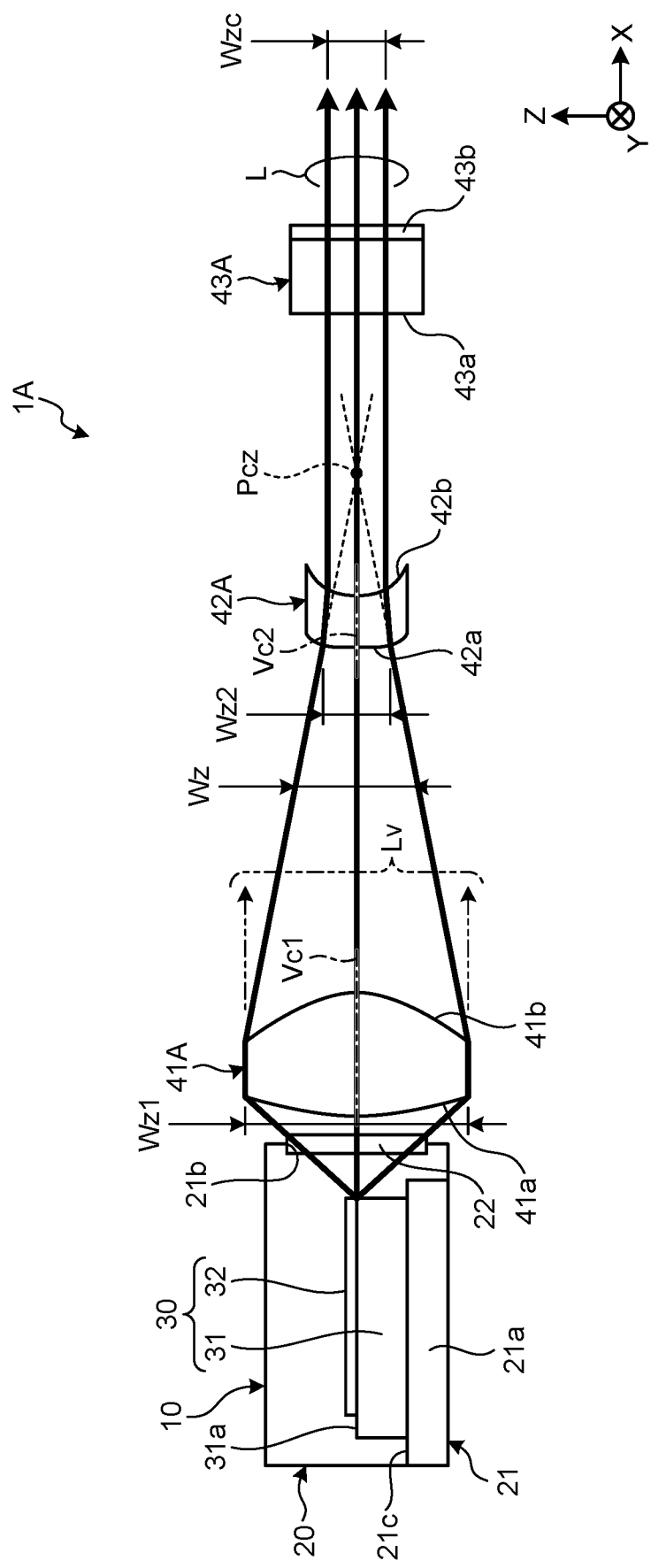
FIG. 1 is an illustrative and schematic side view of a light emitting apparatus of a first embodiment.

A description will be given below of illustrative embodiments. Configurations of the embodiments to be described below and functions and results (effects) which are brought by the configurations are merely examples. The present disclosure is also achievable by those other than the configurations to be disclosed in the following embodiments. Moreover, in accordance with the present disclosure, it is possible to obtain at least one of a variety of effects (also including derivative effects) to be obtained by the configurations.

A plurality of the embodiments to be described below include similar configurations. Hence, in accordance with the configurations of the respective embodiments, similar functions and effects which are based on the similar configurations are obtained. Moreover, hereinafter, in some cases, similar reference numerals and symbols are assigned to those similar configurations, and a duplicate description thereof is omitted.

In the present specification, ordinal numbers are assigned for convenience in order to distinguish components, regions and the like, and do not represent priorities and orders.

Moreover, in the respective drawings, an X-direction is represented by an arrow X, a Y-direction is represented by an arrow Y, and a Z-direction is represented by an arrow Z. The X-direction, the Y-direction, and the Z-direction intersect one another and are perpendicular to one another.

Note that, in FIGS. 1 to 6 and 14, optical paths of laser light L are shown by solid arrows.

First Embodiment

Figure 2:
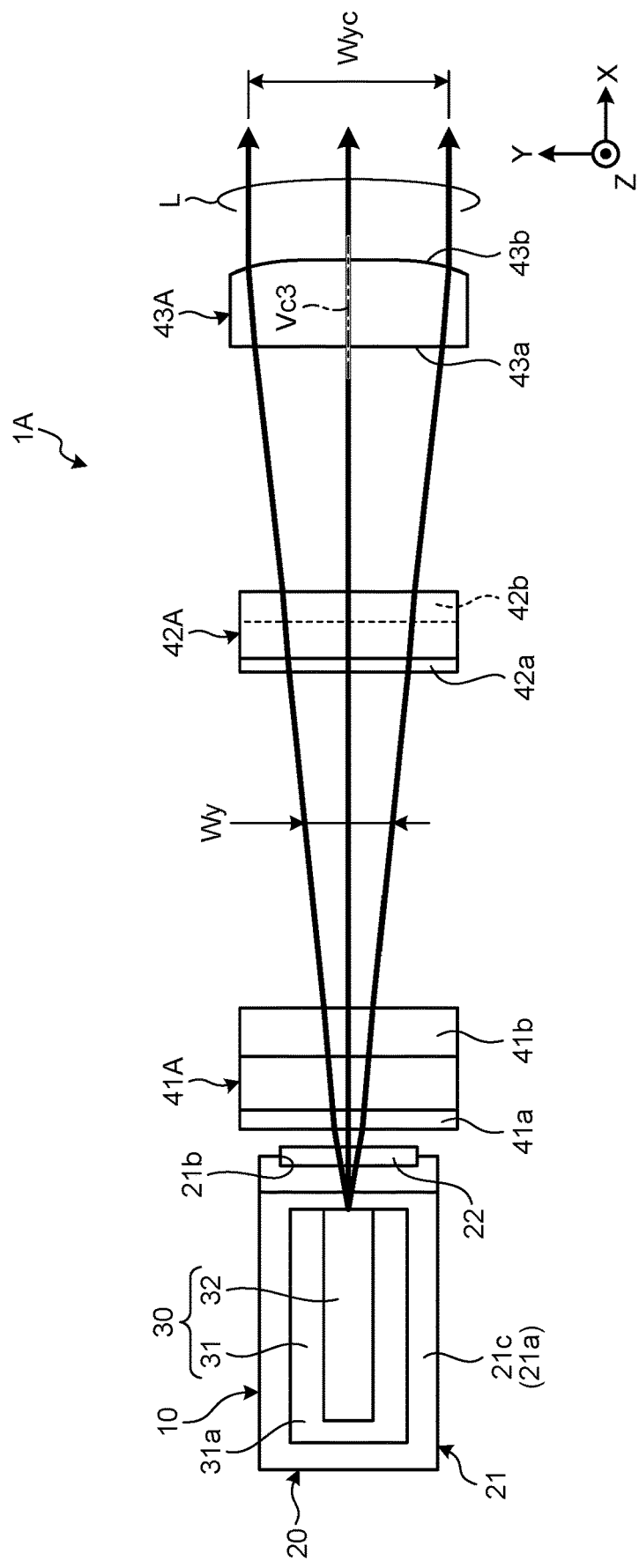
FIG. 2 is an illustrative and schematic plan view of the light emitting apparatus of the first embodiment.

FIG. 1 is a side view illustrating a light emitting apparatus 1A of a first embodiment, and FIG. 2 is a plan view illustrating the light emitting apparatus 1A.

Configuration of Light Emitting Apparatus

As illustrated in FIGS. 1 and 2, the light emitting apparatus 1A includes a light emitting module 10, a first optical element 41A, a second optical element 42A, and a third optical element 43A.

The light emitting module 10 include a light emitting unit 30, and a case 20 that houses the light emitting unit 30.

The case 20 is a rectangular parallelepiped box, and houses the light emitting unit 30. The case 20 has a wall member 21, and a window member 22. For example, the wall member 21 is made of a metal material.

Moreover, the case 20 has a base 21a. The base 21a has a plate shape that intersects the Z-direction. For example, the base 21a is a part (a bottom wall) of the wall member 21. The base 21a is made of a metal material having a high thermal conductivity, for example, such as oxygen-free copper. The oxygen-free copper is an example of a copper-based material. Note that the base 21a may be provided separately from the wall member 21.

An opening portion 21b is provided on an end portion in an X-direction of the wall member 21. The window member 22 that allows transmission of the laser light L is attached to the opening portion 21b. The window member 22 intersects and is perpendicular to the X-direction. The laser light L emitted in the X-direction from the light emitting unit 30 passes through the window member 22, and goes out of the light emitting apparatus 1A. The laser light L is emitted in the X-direction from the light emitting apparatus 1A. The window member 22 is an example of a window.

Boundary portions between a plurality of members (not illustrated) which constitute the wall member 21 (the case 20), boundary portions between the wall member 21 and the window member 22, and the like are sealed so as not to allow passage of gas. That is, the case 20 is hermetically sealed. Note that the window member 22 is a part of the wall member 21.

The light emitting unit 30 includes a sub-mount 31 and a light emitting element 32.

The sub-mount 31 has, for example, a plate shape that intersect and is perpendicular to the Z-direction. The sub-mount 31 is made of an insulating material having a relatively high thermal conductivity, for example, such as aluminum nitride (AIN), ceramics, and glass. On the sub-mount 31, a metallization layer (not illustrated) is formed as an electrode that supplies power to the light emitting element 32.

As illustrated in FIGS. 1 and 2, the sub-mount 31 is mounted on a top surface 21c of the base 21a. The light emitting element 32 is mounted on a top surface 31a of the sub-mount 31. That is, the light emitting element 32 is mounted on the base 21a with the sub-mount 31 interposed therebetween.

The light emitting element 32 is, for example, a semiconductor laser element that has a fast axis (FA) and a slow axis (SA) The light emitting element 32 has an oblong shape that extends in the X-direction. The light emitting element 32 emits the laser light L in the X-direction from an emission aperture (not illustrated) provided on an end portion thereof in the X-direction. The light emitting unit 30 is mounted so that the fast axis of the light emitting element 32 goes along the Z-direction, and that the slow axis thereof goes along the Y-direction. The Z-direction is an example of a fast axis direction, and the Y-direction is an example of a slow axis direction.

Configurations and Arrangements of Respective Optical Elements

The laser light L emitted from the light emitting element 32 goes through the first optical element 41A, the second optical element 42A, and the third optical element 43A in this order, and is collimated in at least the Z-direction and the Y-direction. All of the first optical element 41A, the second optical element 42A, and the third optical element 43A are provided outside the case 20.

In the present embodiment, the first optical element 41A, the second optical element 42A, and the third optical element 43A are arrayed in the X-direction in this order, and all thereof are lenses. The laser light L emitted from the light emitting element 32 passes through the first optical element 41A, the second optical element 42A, and the third optical element 43A in this order. Moreover, for a while since the laser light L is emitted from the light emitting element 32 until passing through the first optical element 41A, the second optical element 42A, and the third optical element 43A, an optical axis of the laser light L is linear, and a fast axis direction of the laser light L goes along the Z-direction, and a slow axis direction of the laser light L goes along the Y-direction.

The first optical element 41A is slightly separated from the window member 22 in the X-direction, or is in contact with the window member 22 in the X-direction.

The first optical element 41A receives incidence of the laser light L that goes through the window member 22. As illustrated in FIG. 1, the first optical element 41A converges the laser light L in at least the Z-direction. The first optical element 41A is a convex lens in at least the Z-direction, in other words, is a convex lens in a cross section perpendicular to at least the Y-direction.

In the present embodiment, as an example, the first optical element 41A has a plane-symmetric shape with respect to a virtual center plane Vc1 as a plane that intersects and is perpendicular to the Z-direction. Each of an incident surface 41a and emitting surface 41b of the first optical element 41A has a prismatic face that has a generatrix going along the Y-direction and extends in the Y-direction. The incident surface 41a is a convex curved surface that is convex in a direction opposite to the X-direction. Moreover, the emitting surface 41b is a convex curved surface that is convex in the X-direction. The emitting surface 41b protrudes larger than the incident surface 41a. The first optical element 41A is a cylindrical lens.

As illustrated in FIG. 1, a beam width Wz in the Z-direction of the laser light L from the first optical element 41A is narrowed as going toward the X-direction. The second optical element 42A receives incidence of such tapered laser light L that goes through the first optical element 41A and is converged at least in the Z-direction. Note that a beam width is a width in a range where an optical power becomes a predetermined value or more in a beam profile of laser light. The predetermined value is, for example, $1/e^2$ of an optical power of a peak.

The second optical element 42A collimates the laser light L in the Z-direction in a state where a beam width Wz2 in the Z-direction is smaller than the beam width Wz1 in the Z-direction on the incident surface 41a to the first optical element 41A. The second optical element 42A is a concave lens in at least the Z-direction, in other words, is a concave lens in a cross section perpendicular to at least the Y-direction. The second optical element 42A is also called a collimating lens.

In the present embodiment, as an example, the second optical element 42A has a plane-symmetric shape with respect to a virtual center plane Vc2 as a plane that intersects and is perpendicular to the Z-direction. Each of an incident surface 42a and emitting surface 42b of the second optical element 42A has a prismatic face that has a generatrix going along the Y-direction and extends in the Y-direction. The incident surface 42a is a convex curved surface that is convex in a direction opposite to the X-direction. Moreover, the emitting surface 42b is a concave curved surface that is concave in the X-direction. When viewed from the Y-direction, a central portion in the Z-direction of the emitting surface 42b is located more on an opposite side to the X-direction than both end portions in the Z-direction thereof.

Moreover, the second optical element 42A is located closer to the first optical element 41A than a convergence point Pcz in the Z-direction of the laser light L by the first optical element 41A.

As illustrated in FIG. 2, a beam width Wy in the Y-direction of the laser light L expands as going toward the X-direction, the laser light L being emitted from the light emitting element 32 and going through the first optical element 41A and the second optical element 42A. The third optical element 43A receives incidence of such flared laser light L that goes through the second optical element 42A and expands the Y-direction. The third optical element 43A collimates the laser light L in the Y-direction. The third optical element 43A is a convex lens in at least the Y-direction, in other words, is a convex lens in a cross section perpendicular to at least the Y-direction. The second optical element 42A is also called a collimating lens.

In the present embodiment, as an example, the third optical element 43A has a plane-symmetric shape with respect to a virtual center plane Vc3 as a plane that intersects and is perpendicular to the Y-direction. Each of an incident surface 43a and emitting surface 43b of the third optical element 43A has a prismatic face that has a generatrix going along the Z-direction and extends in the Z-direction. The incident surface 43a is a plane perpendicular to the X-direction. Moreover, the emitting surface 43b is a convex curved surface that is convex in the X-direction.

As described above, in the present embodiment, the first optical element 41A is provided outside the case 20, and converges the laser light L, which has passed through the window member 22 (a window) provided on the case 20, in the Z-direction (the fast axis direction). Then, the second optical element 42A collimates the laser light L, which has passed through the first optical element 41A, in the Z-direction in a state where the beam width Wz2 in the Z-direction is smaller than the beam width Wz1 in the Z-direction on the incident surface 41a to the first optical element 41A.

As illustrated in FIG. 1, the beam width in the Z-direction of the laser light L emitted from the light emitting element 32 expands as going toward the X-direction. Therefore, if the first optical element 41A is not disposed, and a collimating lens (not illustrated) that collimates the laser light L in the Z-direction is disposed at the position where the first optical element 41A is provided in place of this first optical element 41A, then, as illustrated by double-dashed chain lines in FIG. 1, laser light Lv, which is collimated with a wider beam width Wz1, is obtained. In contrast, in the present embodiment, the laser light L converged in the Z-direction by going through the first optical element 41A is collimated by the second optical element 42A in such a state where the beam width Wz2 in the Z-direction is narrower than the beam width Wz1 in the Z-direction on the incident surface 41a of the first optical element 41A. Hence, in accordance with the present embodiment, a beam width Wzc in the Z-direction of the collimated laser light L may be further reduced.

Moreover, in the present embodiment, the second optical element 42A is located closer to the first optical element 41A than the convergence point Pcz in the Z-direction of the laser light L by the first optical element 41A.

If the second optical element 42A is located farther from the first optical element 41A than the convergence point Pcz, then the convergence point Pcz will appear on an optical path of the laser light L between the first optical element 41A and the second optical element 42A. In this case, it is apprehended that there may occur such a malfunction that dust accumulates on the convergence point Pcz with a high energy density. In this point, in the present embodiment, the second optical element 42A is located closer to the first optical element 41A than the convergence point Pcz, and accordingly, the laser light L is collimated by the second optical element 42A before the laser light L reaches the convergence point Pcz. That is, in accordance with the present embodiment, the convergence point Pcz does not appear on the optical path of the laser light L, and accordingly, the malfunction due to the convergence point Pcz may be avoided from occurring.

Moreover, in the present embodiment, the first optical element 41A is a convex lens in at least the Z-direction, and the second optical element 42A is a concave lens in at least the Z-direction.

With such a configuration, the first optical element 41A and the second optical element 42A may be achieved by relatively simple configurations.

Moreover, in the present embodiment, the first optical element 41A is a lens that has a plane-symmetric shape with respect to the virtual center plane Vc1 that intersects the Z-direction.

With such a configuration, the first optical element 41A may be achieved by a relatively simple configuration.

Moreover, in the present embodiment, the light emitting apparatus 1A includes the third optical element 43A that collimates the laser light L, which goes through the first optical element 41A, in the Y-direction (the slow axis direction).

With such a configuration, the laser light L may be collimated also in the Y-direction.

Second Embodiment

Figure 3:
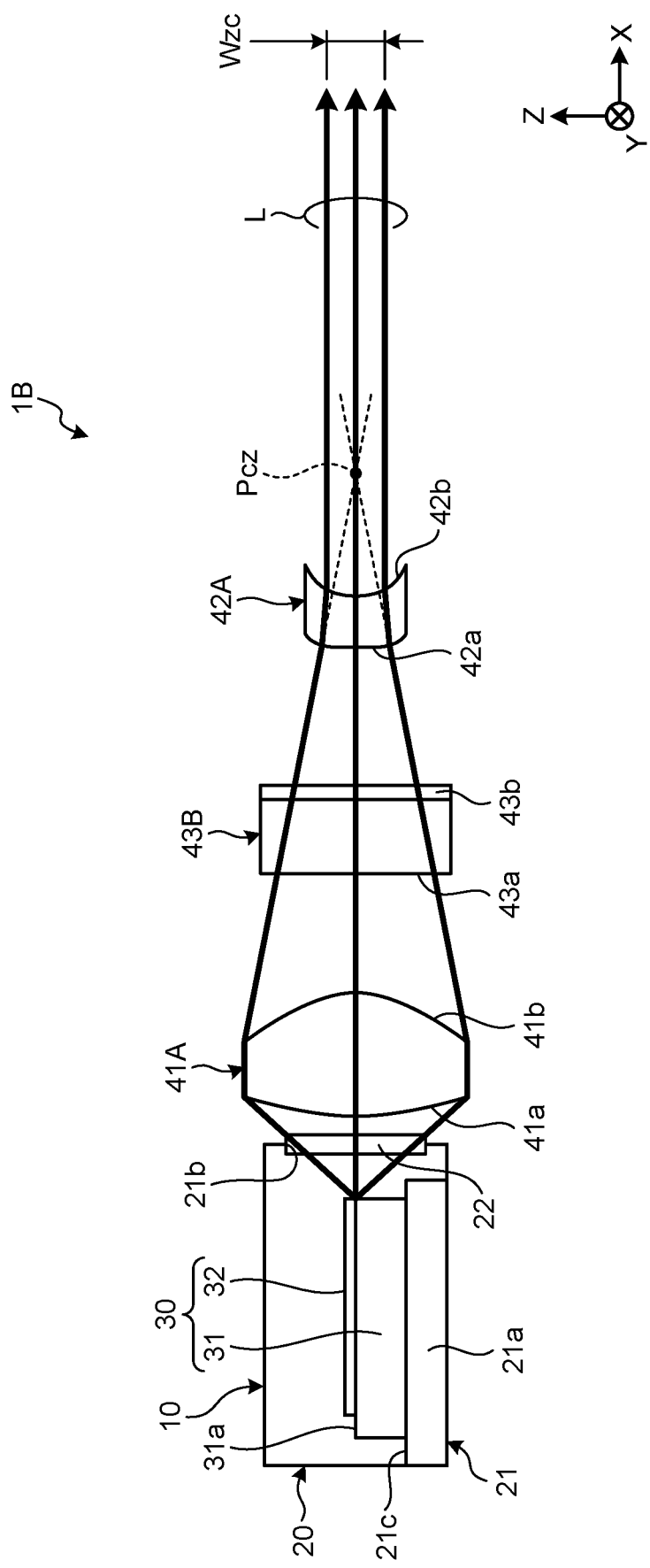
FIG. 3 is an illustrative and schematic side view of a light emitting apparatus of a second embodiment.
Figure 4:
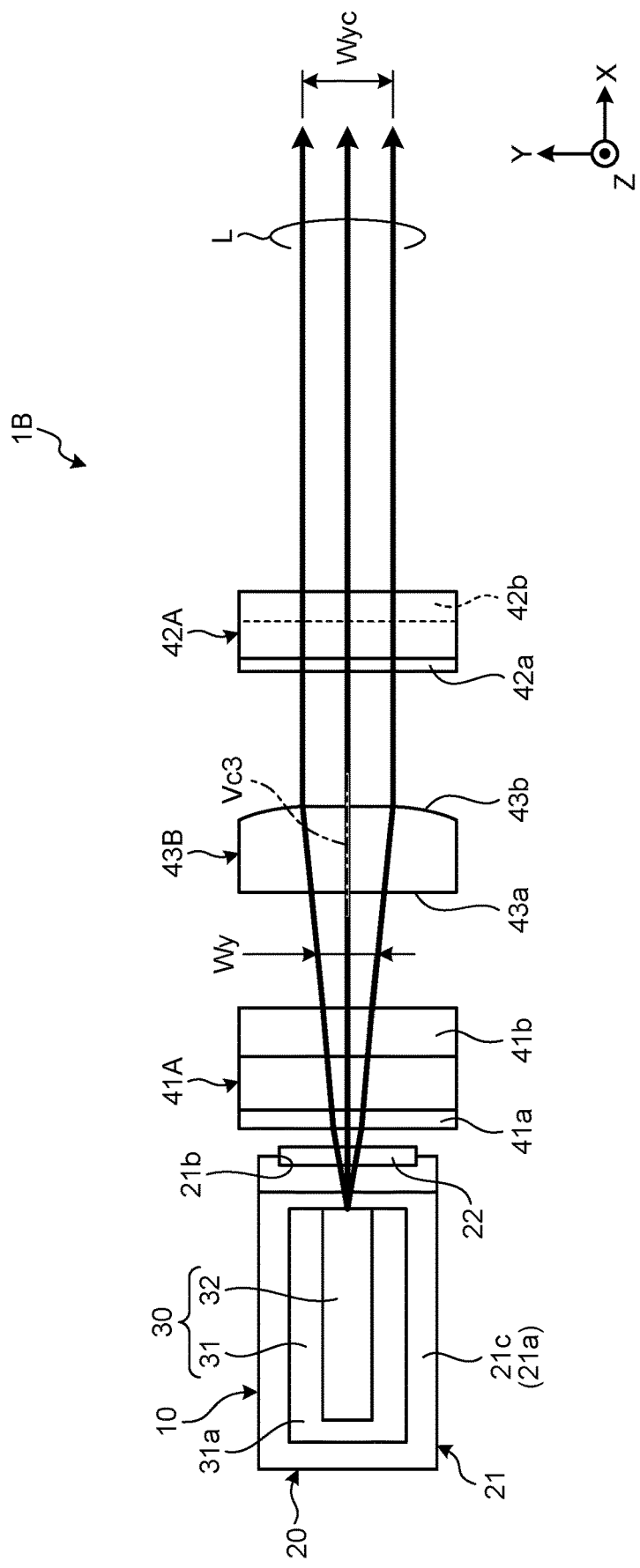
FIG. 4 is an illustrative and schematic plan view of the light emitting apparatus of the second embodiment.

FIG. 3 is a side view illustrating a light emitting apparatus 1B of a second embodiment, and FIG. 4 is a plan view illustrating the light emitting apparatus 1B.

As apparent from comparison of FIG. 3 with FIG. 1 and from comparison of FIG. 4 with FIG. 2, in the present embodiment, a position of a third optical element 43B is different from a position of the third optical element 43A of the above-described first embodiment. Specifically, in the first embodiment, the third optical element 43A is located opposite to the first optical element 41A with respect to the second optical element 42A, and in contrast, in the present embodiment, the third optical element 43B is located at a position close to the first optical element 41A with respect to the second optical element 42A, that is, between the first optical element 41A and the second optical element 42A.

Note that, also in the present embodiment, as in the above-described first embodiment, as an example, the third optical element 43B has a plane-symmetric shape with respect to the virtual center plane Vc3 as a plane that intersects and is perpendicular to the Y-direction. Each of an incident surface 43a and emitting surface 43b of the third optical element 43B has a prismatic face that has a generatrix going along the Z-direction and extends in the Z-direction. The incident surface 43a is a plane perpendicular to the X-direction. Moreover, the emitting surface 43b is a convex curved surface that is convex in the X-direction.

Moreover, configurations and arrangements of the first optical element 41A and the second optical element 42A in the present embodiment are similar to those of the above-described first embodiment.

As described above, in the present embodiment, the third optical element 43B is located between the first optical element 41A and the second optical element 42A. As illustrated in FIG. 3, in the present embodiment, the third optical element 43B is located between the first optical element 41A and the second optical element 42A, and accordingly, the laser light L may be collimated in the Y-direction in a state where the beam width Wy is narrower. Hence, in accordance with the present embodiment, a beam width Wyc in the Y-direction of the collimated laser light L may be further reduced.

Third Embodiment

Figure 5:
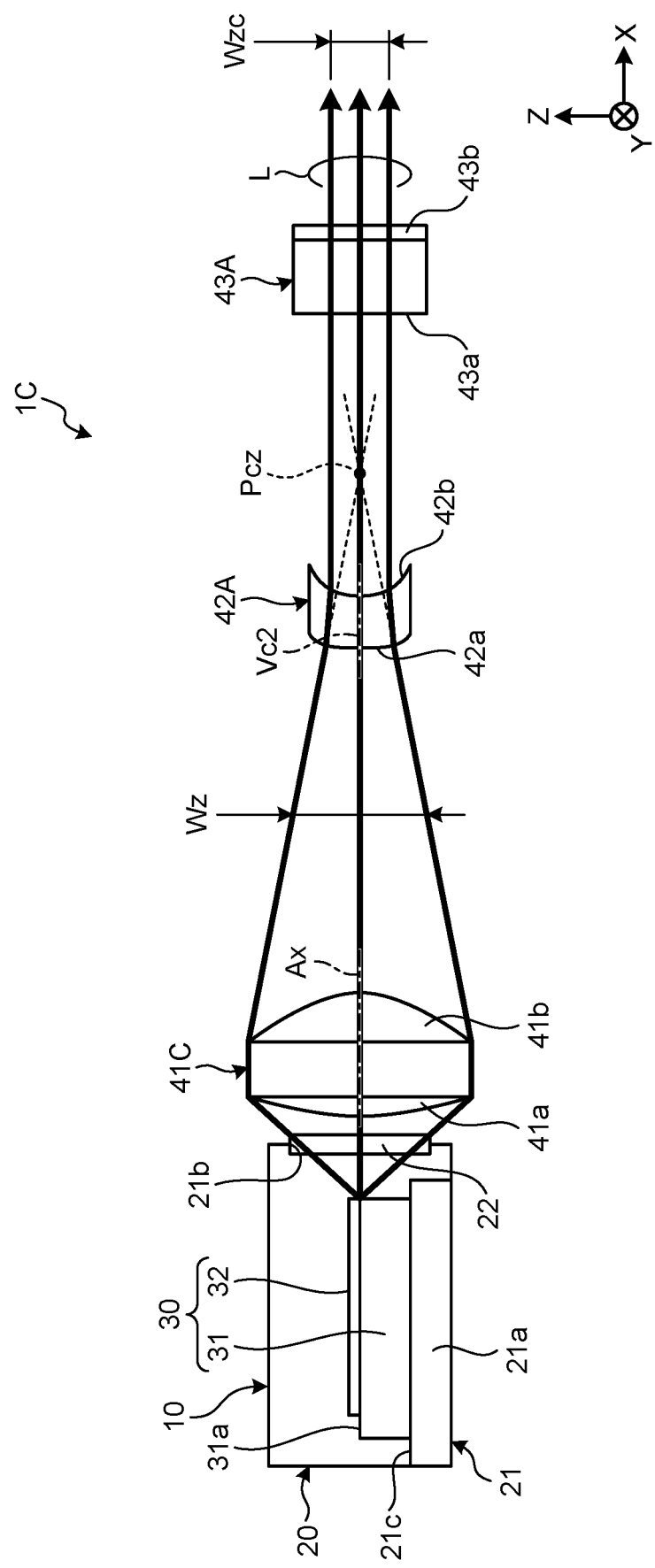
FIG. 5 is an illustrative and schematic side view of a light emitting apparatus of a third embodiment.
Figure 6:
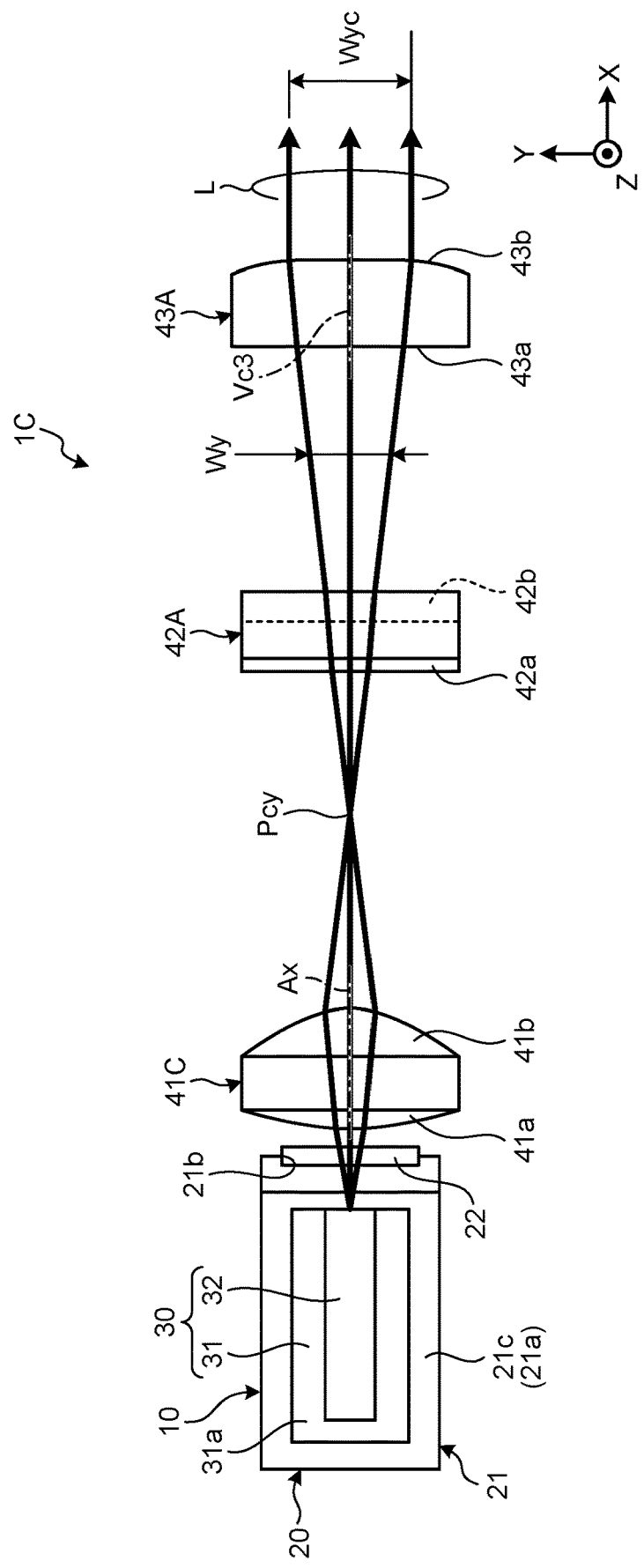
FIG. 6 is an illustrative and schematic plan view of the light emitting apparatus of the third embodiment.

FIG. 5 is a side view illustrating a light emitting apparatus 1C of a third embodiment, and FIG. 6 is a plan view illustrating the light emitting apparatus 1C.

As apparent from comparison of FIG. 6 with FIG. 2 and from comparison of FIG. 5 with FIG. 1, in the present embodiment, a configuration of a first optical element 41C is different from a configuration of the first optical element 41A of the above-described first embodiment. Specifically, in the first embodiment, the first optical element 41A is a lens that has a plane-symmetric shape with respect to the virtual center plane Vc1 as a plane that intersects and is perpendicular to the Z-direction, and in contrast, in the present embodiment, the first optical element 41C is a lens that has an axisymmetric shape with respect to a central axis Ax that goes along the optical axis.

The first optical element 41C is constituted as a rotating body about the central axis Ax. The first optical element 41C is disposed so that the central axis Ax goes along the X-direction and overlaps the optical axis of the laser light L. Each of an incident surface 41a and emitting surface 41b of the first optical element 41C has a surface of revolutions about the central axis Ax that extends in the X-direction. The emitting surface 41b is a convex curved surface that is convex in the X-direction. The emitting surface 41b protrudes larger than the incident surface 41a.

Moreover, also in the present embodiment, the second optical element 42A is located closer to the first optical element 41C than the convergence point Pcz in the Z-direction of the laser light L by the first optical element 41C.

Note that, as illustrated in FIG. 6, a convergence point Pcy in the Y-direction of the laser light L appears between the first optical element 41C and the second optical element 42A; however, since an energy density at the convergence point Pcy is not so high, such a problem like accumulation of dust does not occur.

As described above, in the present embodiment, the first optical element 41C is a lens that has an axisymmetric shape with respect to the central axis Ax that goes along the optical axis of the laser light L.

In accordance with the present embodiment, the laser light L is converged also in directions between the Z-direction and the Y-direction, and accordingly, an effect that aberration of the laser light L is reduced is obtained. Moreover, in accordance with the present embodiment, the first optical element 41C may be achieved by a relatively simple configuration.

Fourth Embodiment

Configuration of Light Source Unit

Figure 7:
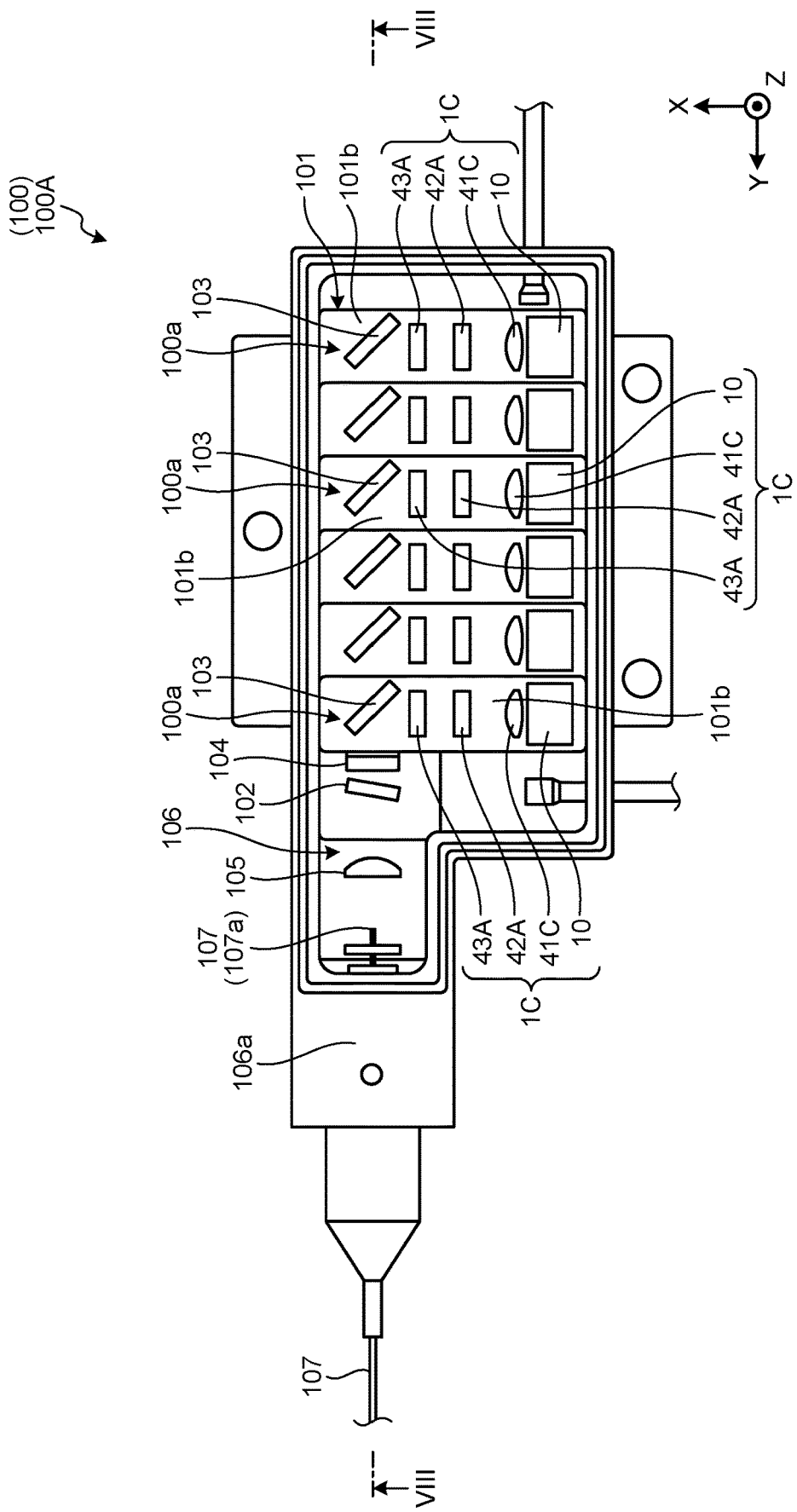
FIG. 7 is an illustrative and schematic plan view of a light source unit of a fourth embodiment.
Figure 8:
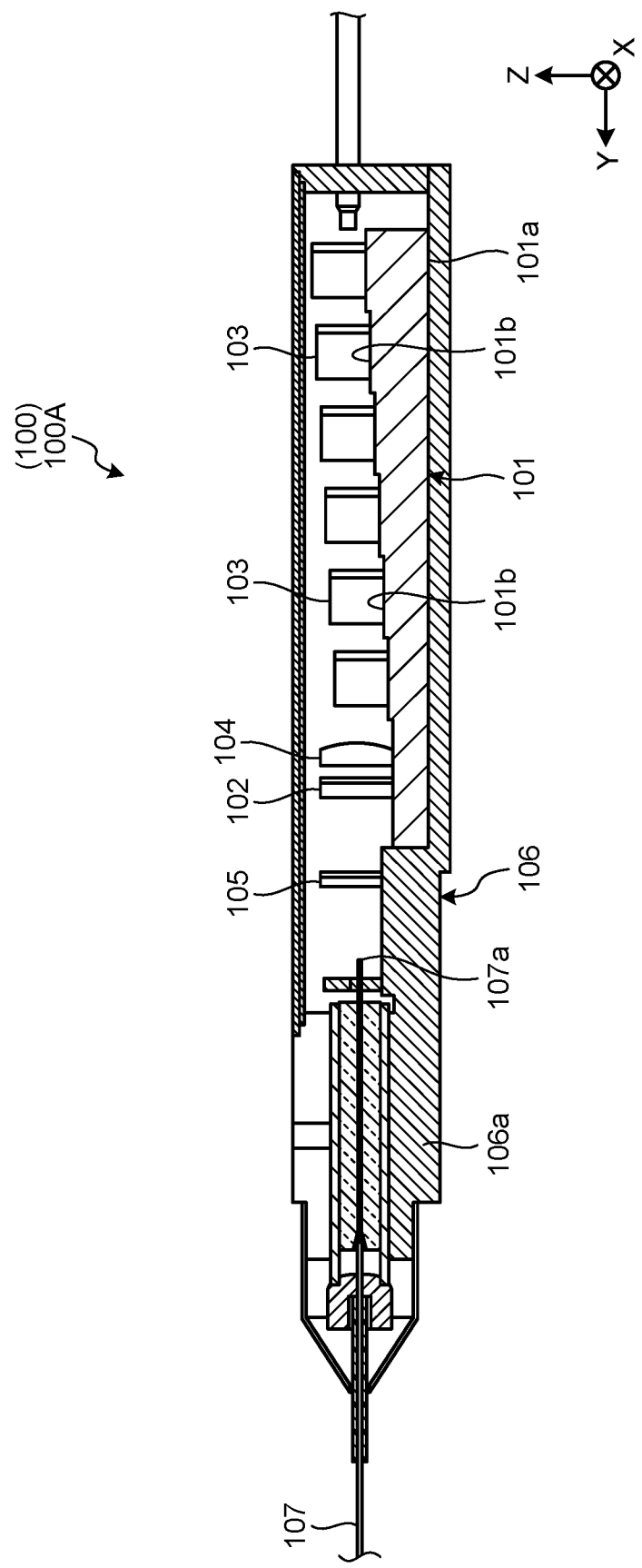
FIG. 8 is a cross-sectional view taken along a line VIII-VIII of FIG. 7.

FIG. 7 is a plan view of a light source unit 100A (100) of a fourth embodiment, which includes a plurality of the light emitting apparatuses 10 of the third embodiment, and FIG. 8 is a cross-sectional view taken along a line VIII-VIII of FIG. 7. Note that, in FIG. 8, an optical filter 102, mirrors 103, and condenser lenses 104 and 105 are illustrated as side views.

On the light source unit 100A, as an example, the light emitting apparatuses 1C of the third embodiment are mounted. The light source unit 100A includes a base 101, the plurality of light emitting apparatuses 1C, a plurality the mirrors 103, the condenser lenses 104 and 105, the optical filter 102, a housing base 106, and an optical fiber 107. The optical filter 102, the mirrors 103, and the condenser lenses 104 and 105 are examples of optical components. Each of the light emitting apparatuses 1C includes the light emitting module 10, the first optical element 41C, the second optical element 42A, and the third optical element 43A.

The mirrors 103 reflect light from the light emitting apparatuses 1C, which travels to the X-direction, to the Y-direction. Each of the mirrors 103 is an example of a deflection component, Light reflected by the mirror 103 is condensed by the condenser lenses 104 and 105.

Herein, as illustrated in FIG. 7, sub-units 100a, each of which includes the light emitting apparatus 1C (that is, the light emitting module 10, the first optical element 41C, the second optical element 42A, and the third optical element 43A) and the mirror 103, are arrayed in the Y-direction at substantially equal intervals, Moreover, as illustrated in FIG. 8, the plurality of sub-units 100a are arranged so as to shift from one another in the Z-direction. Each of the sub-units 100a is constituted so that, as closer to the condenser lens 104, a distance thereof in the Z-direction from a bottom surface 101a of the base 101 is shorter. Hence, as illustrated in FIG. 8, on a surface 101b of the base 101, step differences which shift in a direction opposite to the Z-direction as going toward the Y-direction are provided. Each of the step differences intersects and is perpendicular to the Z-direction, and extends substantially along the X-direction and the Y-direction. Each of the sub-units 100a is mounted on each of the step differences of the surface 101b.

In such a configuration, pieces of light from the respective sub-units 100a (the respective mirrors 103) are arrayed at equal intervals in the Z-direction on an incident surface of the condenser lens 104. The pieces of light from the respective sub-units 100a go through the condenser lens 104, the optical filter 102, and the condenser lens 105, and are input to an input portion 107a of the optical fiber 107. The optical fiber 107 is supported by a fiber support portion 106a provided in the housing base 106.

Note that the light emitting apparatuses 10 of the light source unit 100A are replaceable by the light emitting apparatuses 1A and 1B of other embodiments.

Figure 9:
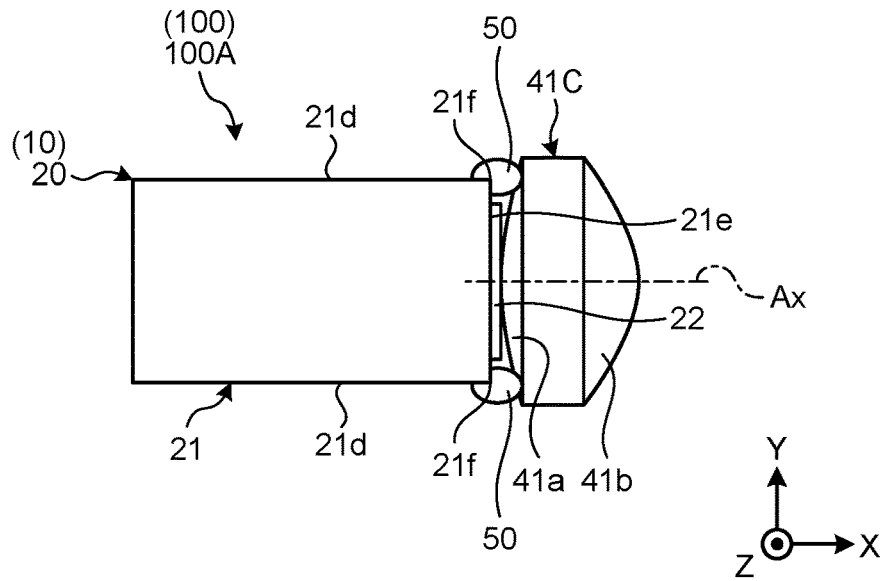
FIG. 9 is an illustrative and schematic plan view of a part of the light source unit of the fourth embodiment, illustrating an attachment structure of a first optical element.

FIG. 9 is a plan view illustrating an attachment structure of the first optical element 41C. As illustrated in FIG. 9, the first optical element 41C is fixed to the case 20 of the light emitting module 10 with joint portions 50 interposed therebetween. With such a configuration, by using the case 20, the attachment structure of the first optical element 41C may be achieved by a relatively simple configuration. The light emitting module 10 that has the case 20 is attached onto the surface 101b, and protrudes from the surface 101b to the Z-direction. The light emitting module 10 is an example of a protruding portion. Moreover, the joint portion 50 are also called fixing portions. The Z-direction is an example of a direction that intersects the surface 101b.

The joint portions 50 are, for example, an adhesive made of a synthetic resin material. The joint portions 50 may be an electromagnetic wave-setting adhesive, or a thermosetting adhesive.

The joint portions 50 are interposed between a peripheral edge portion of the first optical element 41C, which is out of the optical path of the laser light, and a corner portion 21f between side surfaces 21d on both sides in the Y-direction of the case 20 and a front surface 21e in the X-direction thereof, and join the corner portion 21f and the peripheral edge portion to each other.

On a plurality of spots, the case 20 and the first optical element 41C are joined to each other with the joint portions 50 interposed therebetween. Two joint portions 50 illustrated in FIG. 9 are separated from each other in the Y-direction. Moreover, also at positions separate in a direction opposite to the Z-direction from at least one of the two joint portions 50 illustrated in FIG. 9, joint portions 50 (not illustrated) are present, and the case 20 and the first optical element 41C are joined to each other by three or four joint portions 50. Note that at least one of the two joint portions 50 illustrated in FIG. 9 may extend by some length in the direction opposite to the Z-direction. In this case, the case 20 and the first optical element 41C are joined to each other by two joint portions 50. Hence, the case 20 and the first optical element 41C may be joined to each other by two or more joint portions 50.

If the first optical element 41C is supported in a cantilever manner by only the joint portions 50 interposed between the first optical element 41C and the surface 101b of the base 101, then it is apprehended that the optical axis of the laser light from the first optical element 41C may shift in the Z-direction or the opposite direction to the Z-direction with respect to the X-direction due to a slight inclination (fall) of the first optical element 41C with respect to the Z-direction. In this case, it is apprehended that the pieces of light from the respective sub-units 100a (the respective mirrors 103) may be made incident onto positions out in the Z-direction from desired positions of the condenser lens 104, resulting in a decrease of convergence in the Z-direction of the laser light.

In this point, in the present embodiment, the first optical element 41C is joined to the case 20 of the light emitting module 10 with the joint portions 50 interposed therebetween. With such a configuration, the case 20 may support the first optical element 41C, and accordingly, an inclination of the first optical element 41C with respect to the Z-direction may be suppressed, and an inclination of the laser light in the Z-direction, and eventually, a decrease of the convergence in the Z-direction of the spatially coupled laser light may be suppressed.

Moreover, as mentioned above, in the present embodiment, the first optical element 41C and the case 20 are joined to each other with the plurality of joint portions 50 interposed therebetween, the joint portions 50 being separate from each other in the Z-direction. With such a configuration, the inclination of the first optical element 41C with respect to the Z-direction may be further suppressed, and the inclination of the laser light in the Z-direction, and eventually, the decrease of the convergence of the laser light may be further suppressed. The base 101 is an example of a base, and the surface 101b is an example of a first surface.

Moreover, in the present embodiment, in the direction (the X-direction) that goes along the central axis Ax (the optical axis), the joint portions 50 are interposed between the first optical element 41C and the case 20. With such a configuration, even if there occur shrinkage, expansion, and the like of the joint portions 50, the first optical element 41C becomes likely to move in parallel to the X-direction relatively to the case 20. In other words, the first optical element 41C becomes less likely to be inclined.

Moreover, in the present embodiment, the plurality of joint portions 50 are arranged with the central axis Ax sandwiched therebetween. The matter that the plurality of joint portions 50 are arranged with the central axis Ax sandwiched therebetween means that, when viewed in the direction that goes along the central axis Ax (the X-direction), the plurality of joint portions 50 are arranged on mutually opposite sides with a virtual straight line (a virtual plane, not illustrated) sandwiched therebetween, the virtual straight line being a line where the plurality of joint portions 50 go through the central axis Ax. With such a configuration, even if there occur shrinkage, expansion, and the like of the joint portions 50, the first optical element 41C becomes likely to move in parallel to the X-direction. In other words, the first optical element 41C becomes less likely to be inclined. Moreover, in the present embodiment, when viewed in the X-direction, the plurality of joint portions 50 may be arranged on two or more spots around the central axis Ax. With such a configuration, even if there occur shrinkage, expansion, and the like of the joint portions 50, the first optical element 41C becomes likely to move in parallel to the X-direction relatively to the case 20. In other words, the first optical element 41C becomes less likely to be inclined.

Moreover, each of the joint portions 50 may expand with a required area along a virtual plane that intersects the X-direction, for example, along a YZ-plane. In this vase, even if there occur shrinkage, expansion, and the like of the joint portions 50, the first optical element 41C becomes more likely to move in parallel relatively to the case 20 as the area is wider. In other words, the first optical element 41C becomes less likely to be inclined.

Figure 10:
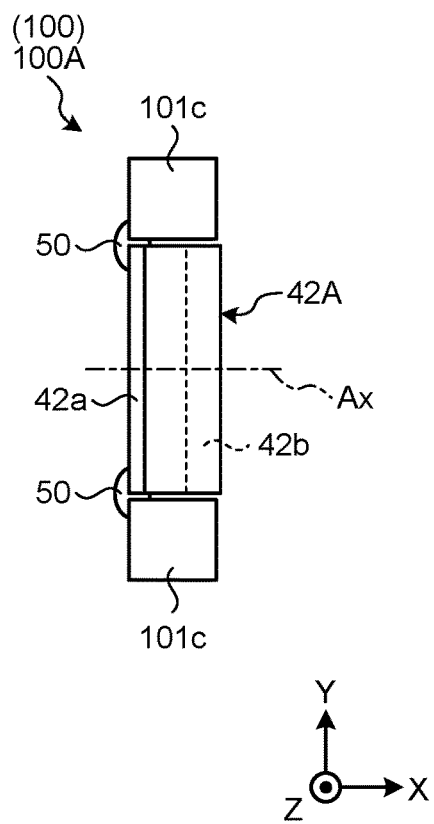
FIG. 10 is an illustrative and schematic plan view of a part of the light source unit of the fourth embodiment, illustrating an attachment structure of a second optical element.

FIG. 10 is a plan view illustrating an attachment structure of the second optical element 42A. As illustrated in FIG. 10, the second optical element 42A is attached to posts 101c, which protrude in the Z-direction from the surface 101b, with joint portions 50 interposed therebetween. As an example, the posts 101c have a quadrangular prismatic shape, but may have other shapes such as a columnar shape. The posts 101c are an example of the protruding portions. The posts 101c are arranged on both sides in the Y-direction with respect to the second optical element 42A.

Moreover, in the present embodiment, also at positions separate in a direction opposite to the Z-direction from the joint portions 50 illustrated in FIG. 10, joint portions 50 (not illustrated) are present, and the post 101c and the second optical element 42A are joined to each other by two joint portions 50.

Onto the surface 101b of the base 101, the posts 101c may be attached with a joining material, for example, such as an adhesive and solder paste interposed therebetween, may be welded, may be attached with fixtures such as screws, or may be constituted integrally with the base 101. The adhesive may be an electromagnetic wave-setting adhesive, or a thermosetting adhesive.

With such a configuration, the posts 101c may support the second optical element 42A, and accordingly, an inclination of the second optical element 42A with respect to the Z-direction may be suppressed, and an inclination of the laser light in the Z-direction, and eventually, a decrease of the convergence in the Z-direction of the spatially coupled laser light may be suppressed. Note that the third optical element 43A may also be supported by posts (not illustrated) similar to the posts 101c.

Fifth Embodiment

Figure 11:
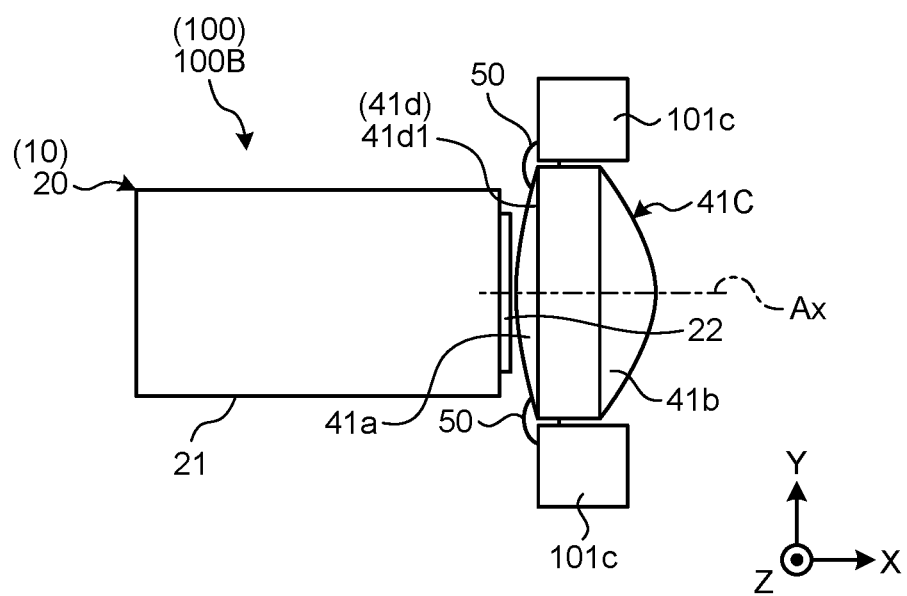
FIG. 11 is an illustrative and schematic plan view of a part of a light source unit of a fifth embodiment, illustrating an attachment structure of a first optical element.
Figure 12:
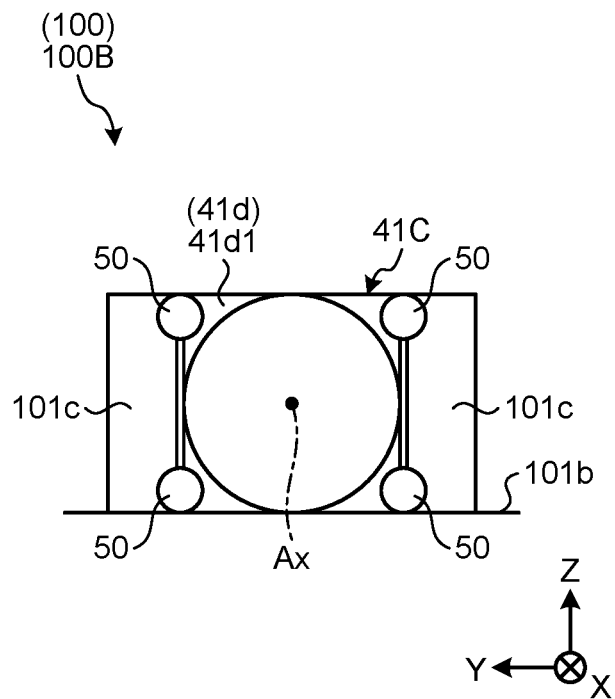
FIG. 12 is an illustrative and schematic rear view of the part of the light source unit of the fifth embodiment, illustrating an attachment structure of the first optical element.

FIG. 11 is a plan view of a part of a light source unit 100B (100) of a fifth embodiment, illustrating an attachment structure of the first optical element 41C. Moreover, FIG. 12 is a rear view of the first optical element 41C and the posts 101c, that is, an attachment structure of the first optical element 41C when viewed in the X-direction. Except for the attachment structure of the first optical element 41C, which is illustrated in FIGS. 11 and 12, the light source unit 100B includes a similar configuration to that of the light source unit 100A of the fourth embodiment.

As illustrated in FIGS. 11 and 12, in the present embodiment, the first optical element 41C is joined to the posts 101c, which protrude in the Z-direction from the surface 101b, with the plurality of joint portions 50 interposed therebetween. The posts 101c are arranged on both sides in the Y-direction with respect to the first optical element 41C. In each of the posts 101c, two joint portions 50 are arranged separately from each other in the Z-direction. The number of joint portions 50 in each of the posts 101c is not limited to two, and may be three. Moreover, as illustrated in FIG. 12, the two joint portions 50 are arranged on an upper end and lower end of the post 101c; however, not limited to this, may be arranged at positions separate from the upper end and lower end of the post 101c.

Moreover, on a central portion in the X-direction (the optical axis direction) of the first optical element 41C, the first optical element 41C has protruding portions 41d which protrude outside in a radial direction of the optical axis, and the joint portions 50 are interposed between the posts 101c and end surfaces 41d1 in the direction opposite to the X-direction of the protruding portions 41d. With such a configuration, the joint portions 50 may be suppressed from interfering with the optical path of the laser light.

Also in accordance with the present embodiment, the posts 101c may support the first optical element 41C, and accordingly, the inclination of the first optical element 41C with respect to the Z-direction may be suppressed, and the inclination of the laser light in the Z-direction, and eventually, the decrease of the convergence in the Z-direction of the spatially coupled laser light may be suppressed.

Sixth Embodiment

Figure 13:
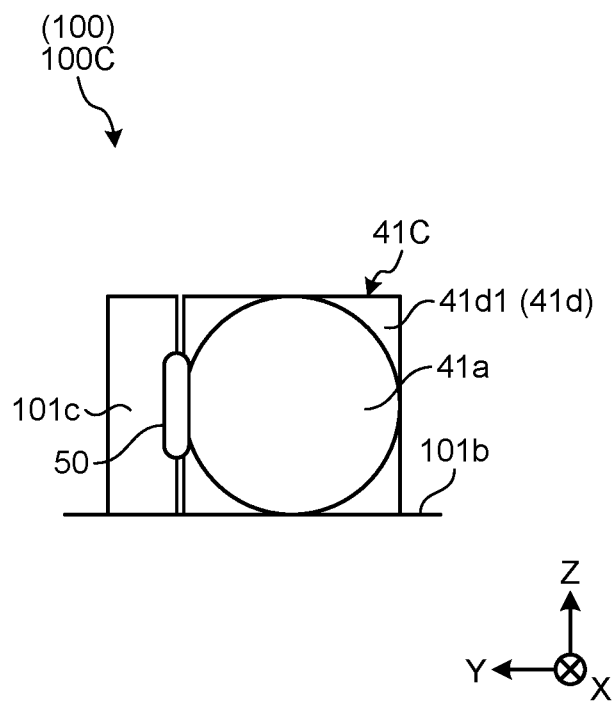
FIG. 13 is an illustrative and schematic rear view of a part of a light source unit of a sixth embodiment, illustrating an attachment structure of a first optical element.

FIG. 13 is a rear view of the first optical element 41C and the posts 101c of a sixth embodiment, that is, an attachment structure of the first optical element 41C when viewed in the X-direction. Except for the attachment structure of the first optical element 41C, which is illustrated in FIG. 13, a light source unit 100C (100) includes a similar configuration to that of the light source unit 100A of the fourth embodiment.

As illustrated in FIG. 13, in the present embodiment, by such a joint portion 50 that extends in the Z-direction, the first optical element 41C and the post 101c is joined to each other. As in the present embodiment, the first optical element 41C and the post 101c (the protruding portion) are joined to each other by the joint portion 50 that extends in the Z-direction. In this way, also in such a configuration in which the plurality of joint portions 50 are not provided, the inclination of the first optical element 41C with respect to the Z-direction may be suppressed, and the inclination of the laser light in the Z-direction, and eventually, the decrease of the convergence in the Z-direction of the spatially coupled laser light may be suppressed. A length in the Z-direction of the joint portion 50 just needs to be a length enough to suppress the inclination of the first optical element 41C, and is preferably ¼ or more of the length in the Z-direction of the first optical element 41C, more preferably ⅓ thereof. Moreover, a direction where the joint portion 50 extends is not limited to the Z-direction.

Moreover, in the present embodiment, in the Y-direction that intersects the central axis Ax, the joint portion 50 is interposed between the first optical element 41C and the post 101c. With such a configuration, even if there occur shrinkage, expansion, and the like of the joint portion 50, the first optical element 41C becomes likely to move in parallel to the y-direction relatively to the post 101c. In other words, the second optical element 42A becomes less likely to be inclined.

Seventh Embodiment

Figure 14:
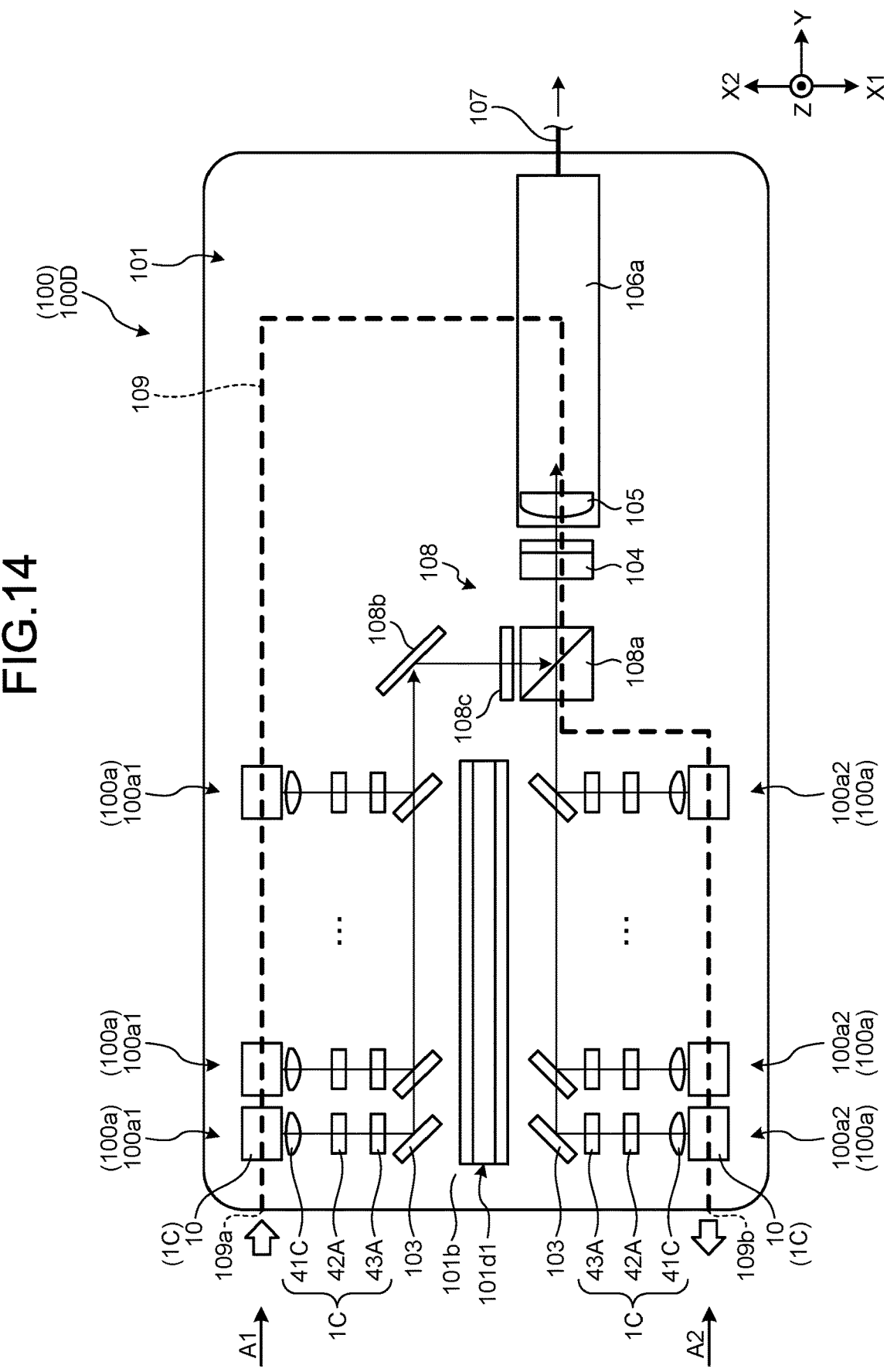
FIG. 14 is an illustrative and schematic plan view of a part of a light source unit of a seventh embodiment.

FIG. 14 is a schematic configuration diagram of a light source unit 100D (100) of a seventh embodiment, and is a plan view of an inside of the light source unit 100D when viewed in a direction opposite to the Z-direction.

As illustrated in FIG. 14, the light source unit 100D includes: the base 101; the optical fiber 107 fixed to the base 101; a plurality of sub-units 100a, each of which includes the light emitting apparatus 1C and the mirror 103; and a photosynthesis unit 108 the synthesizes pieces of laser light from the plurality of sub-units 100a.

The optical fiber 107 is an output optical fiber, and is fixed to the base 101 with a fiber support portion 106a that supports an end portion (not illustrated) of the optical fiber 107 interposed therebetween.

As a part of the base 101, the fiber support portion 106a may be constituted integrally with the base 101, or the fiber support portion 106a constituted as a separate member from the base 101 may be attached to the base 101 with fixtures, for example, such as screws interposed therebetween.

Herein, it is assumed that the base 101 includes a region corresponding to the housing base 106 of the above-described fourth embodiment. The base 101 is made of a material having a high thermal conductivity, for example, such as a copper-based material and an aluminum-based material. Moreover, the base 101 is covered with a cover (not illustrated). The optical fiber 107, the sub-units 100a, the photosynthesis unit 108, and the fiber support portion 106a are housed and sealed in a storage chamber formed between the base 101 and the cover.

As in the above-described fourth embodiment, on the surface 101b of the base 101, step differences on which the sub-units 100a positionally shift in the direction opposite to the Z-direction as going toward the Y-direction are provided (see FIG. 8). For each of arrays A1 and A2 in which the plurality of sub-units 100a are arrayed at predetermined intervals (for example, regular intervals) in the Y-direction, the sub-units 100a are arranged on the respective step differences. Hence, positions in the Z-direction of the sub-units 100a included in the array A1 shift in the direction opposite to the Z-direction as going toward the Y-direction, and positions in the Z-direction of the sub-units 100a included in the array A2 also shift in the direction opposite to the Z-direction as going toward the Y-direction.

Pieces of laser light output from the light emitting modules 10 of the plurality of sub-units 100a are synthesized with one another by the photosynthesis unit 108. The photosynthesis unit 108 includes optical components such as a combiner 108a, a mirror 108b, and a halfwave plate 108c.

The mirror 108b directs the pieces of laser light, which are from the sub-units 100a of the array A1, via a halfwave plate 108c toward the combiner 108a. The halfwave plate 108c rotates polarization planes of the pieces of light from the array A1. The pieces of laser light from the sub-units 100a of the array A2 are directly input to the combiner 108a.

The combiner 108a synthesizes the pieces of light from the two arrays A1 and A2 together, and outputs light thus synthesized toward the condenser lens 104. The combiner 108a may also be called a polarization composite element.

Moreover, the base 101 is provided with a cooling medium passage 109 for cooling the sub-units 100a (the light emitting modules 10), the fiber support portion 106a, the condenser lenses 104 and 105, the combiner 108a, and the like. In the cooling medium passage 109, for example, a cooling medium such as a cooling liquid flows. The cooling medium passage 109 passes, for example, near mounting surfaces of the respective components of the base 101, for example, immediately under the same or the vicinities thereof, and an inner surface of the cooling medium passage 109 and a cooling medium (not illustrated) in the cooling medium passage 109 are thermally connected to components and regions as cooling targets, that is, the sub-units 100a (the light emitting modules 10), the fiber support portion 106a, the condenser lenses 104 and 105, the combiner 108a, and the like. Via the base 101, heat exchange of the cooling medium with the components and the regions is performed, and the components are cooled. Note that, as an example, an inlet 109a and outlet 109b of the cooling medium passage 109 are provided on end portions in a direction opposite to the Y-direction of the base 101; however, may be provided at other positions.

As illustrated in FIG. 14, in a sub-units 100a1 (100a) of the array A1, the pieces of laser light directed to an X1-direction are reflected to the Y-direction by the mirrors 103, and in a sub-units 100a2 (100a) of the array A2, the pieces of laser light directed to an X2-direction opposite to the X1-direction are reflected to the Y-direction by the mirrors 103. The sub-units 100a1 are an example of first sub-units, and the sub-units 100a2 are an example of second sub-units.

Moreover, the X1-direction is an example of a first direction, and the X2-direction is an example of a direction opposite to the first direction.

As described above, when the pieces of laser light travel in such directions that face each other between the sub-units 100a1 of the array A1 and the sub-units 100a2 of the array A2, it is apprehended that leak light of the pieces of laser light which travel in the sub-units 100a of one of the arrays A1 and A2 to a direction of approaching the other array may interfere with the pieces of laser light in the sub-units 100a of the other arrays. Moreover, as in the above-described fourth to sixth embodiments, in the case where the optical components such as the first optical elements 41C, the second optical elements 42A, and the third optical elements 43A are joined to the base 101 with the joint portions 50 interposed therebetween, when the joint portions 50 are irradiated with the leak light, it is apprehended that the joint portions 50 may be damaged. For example, the leak light is derived from laser light that unwillingly reflects and transmits in each of the optical components.

In this connection, in the present embodiment, a shielding portion 101d1 that shields the leak light may be provided between the array A1 and the array A2.

Figure 15:
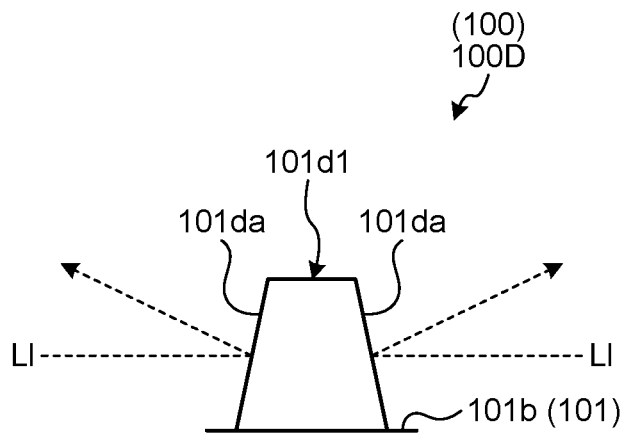
FIG. 15 is an illustrative and schematic side view of a shielding portion included in the light source unit of the seventh embodiment.

FIG. 15 is a side view of the shielding portion 101d1. The shielding portion 101d1 protrudes to the Z-direction from the surface 101b. A position of a top portion in the Z-direction of the shielding portion 101d1, that is, a height therein from the surface 101b is set to a height enough to shield leak light L1 shown by broken arrows. For example, the position of the top portion in the Z-direction of the shielding portion 101d1 is located at least at the same level as positions of top portions in the Z-direction of the first optical elements 41C, the second optical element 42A, and the third optical elements 43A which are included in the sub-units 100a or at a level more forward in the Z-direction of the same.

Onto the surface 101b of the base 101, the shielding portion 101d1 may be attached with a joining material, for example, such as an adhesive and solder paste interposed therebetween, may be welded, may be attached with fixtures such as screws, or may be constituted integrally with the base 101. The adhesive may be an electromagnetic wave-setting adhesive, or a thermosetting adhesive, or an adhesive having a relatively high thermal conductivity.

Moreover, in the present embodiment, the shielding portion 101d1 has reflecting surfaces 101da on an end portion in the X1-direction thereof and an end portion in the X2-direction thereof. Each of the reflecting surfaces 101da reflects the leak light L1 to a direction out of a direction opposite to an incident direction of the leak light L1. That is, the reflecting surface 101da that receives incidence of the leak light L1 that travels to the X2-direction reflects the leak light L1 to the direction out of the X1-direction, in other words, to a direction inclined with respect to the X1-direction. Moreover, the reflecting surface 101da that receives incidence of the leak light L1 that travels to the X1-direction reflects the leak light L1 to the direction out of the X2-direction, in other words, to a direction inclined with respect to the X2-direction. That is, each of the reflecting surfaces 101da deflects the leak light L1 to the X1-direction or the X2-direction. Thus, reflected light of the leak light L1 on each of the reflecting surfaces 101da may be suppressed from interfering with the laser light that is transferred in the sub-units 100a. Note that each of the reflecting surfaces 101da is inclined so as to go toward one of the X1-direction and the X2-direction as going toward the Z-direction; however, the inclination direction is not limited to this. Moreover, for example, the each of reflecting surfaces 101da may be a curved surface. Further, when the reflecting surface 101da is such a curved surface, the reflecting surface 101da may be spherical, or may be cylindrically surface-shaped.

Eighth Embodiment

Figure 16:
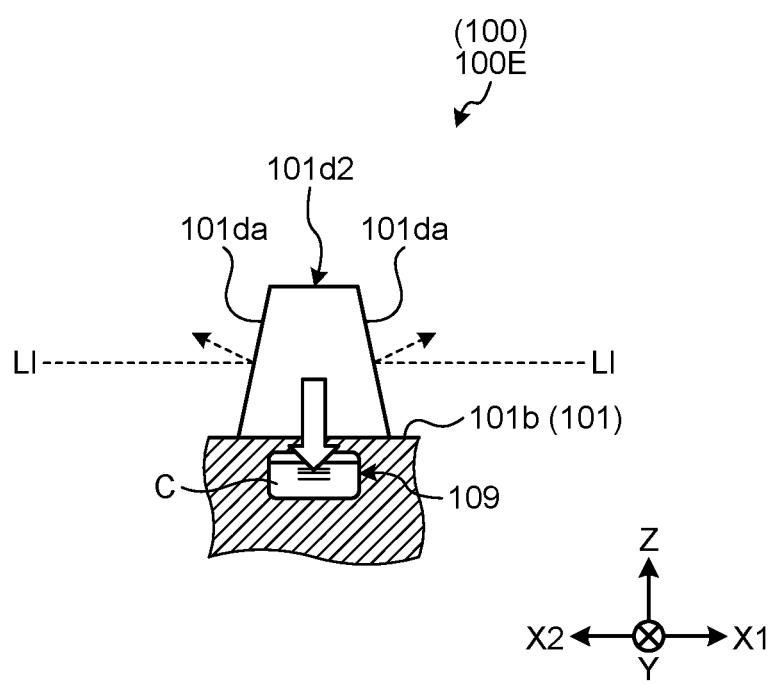
FIG. 16 is an illustrative and schematic side view (a partially cross-sectional view) of a shielding portion included in a light source unit of an eighth embodiment.

FIG. 16 is a side view (a partially cross-sectional view) of a shielding portion 101d2 included in a light source unit 100E (100) of an eighth embodiment. Except for that the shielding portion 101d2 illustrated in FIG. 16 is provided in place of the shielding portion 101d1 illustrated in FIG. 15, the light source unit 100E includes a similar configuration to that of the light source unit 100D of the seventh embodiment.

However, in the present embodiment, onto each of reflecting surfaces 101da of the shielding portion 101d2, applied is paint, for example, such as black paint, the paint converting energy of laser light into thermal energy. In this case, each of the reflecting surfaces 101da functions as an absorption surface that absorbs the energy of the laser light. The reflecting surface 101da is an example of an absorption surface. With such a configuration, the intensity of the reflected light on the reflecting surface 101da may be further lowered, and accordingly, an adverse effect to be given by the reflected light to other regions in the light source unit 100D may be further reduced.

Moreover, as illustrated in FIG. 16, in the base 101, a cooling medium passage 109, through which the cooling medium C flows, is provided so as to overlap the shielding portion 101d2 in the Z-direction. The cooling medium passage 109 is provided so that a part of a section from an inlet 109a of the cooling medium passage 109 to an outlet 109b thereof passed through a position that overlaps the shielding portion 101d2 in the Z-direction. In this section, the cooling medium passage 109 extends, for example, to the Y-direction along the shielding portion 101d2.

The shielding portion 101d2 and the base 101 are made of a material having a high thermal conductivity, for example, such as a copper-based material and an aluminum-based material, and the shielding portion 101d2 is thermally connected to the inner surface of the cooling medium passage 109 and the cooling medium C. Hence, in accordance with the present embodiment, heat exchange is performed between the cooling medium C and the shielding portion 101d2 via the shielding portion 101d2 and the base 101, the shielding portion 101d2 in which heat based on the energy of the leak light L1 is generated is cooled, and temperatures of the shielding portion 101d2 and of the periphery of the shielding portion 101d2 may be suppressed from rising.

Ninth Embodiment

Figure 17:
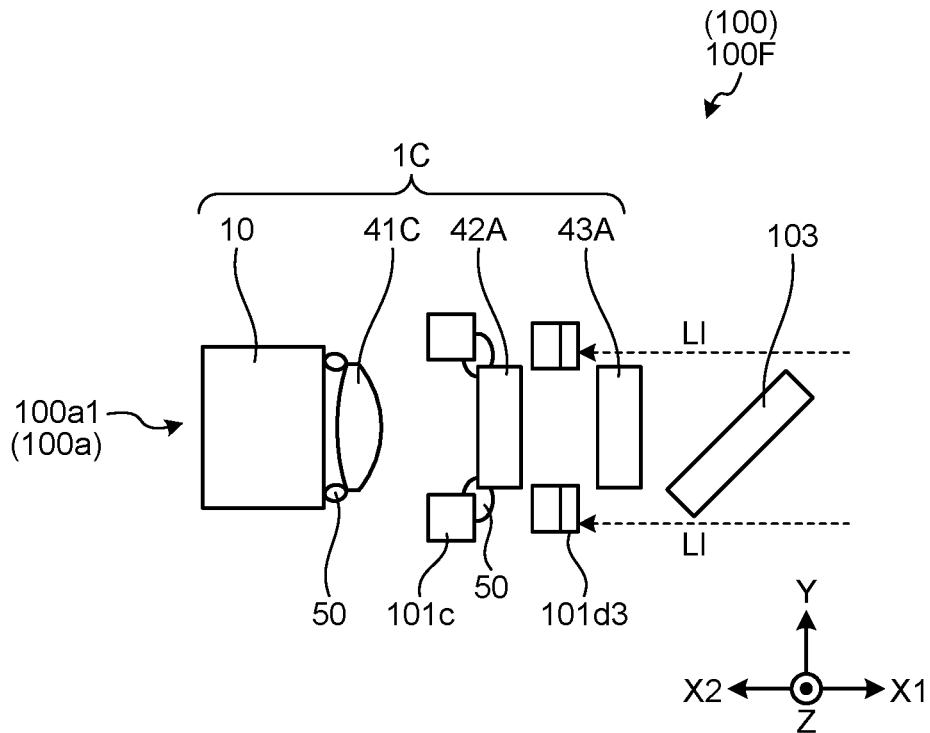
FIG. 17 is an illustrative and schematic plan view of a part a light source unit of a ninth embodiment.

FIG. 17 is a plan view of a sub-unit 100a1 (100a) included in a light source unit 100F (100) of a ninth embodiment. Except for that the sub-unit 100a illustrated in FIG. 17 is provided in place of the sub-unit 100a illustrated in FIG. 14, the light source unit 100F includes a similar configuration to that of the light source unit 100D of the seventh embodiment. Note that, in FIG. 17, the sub-unit 100a1 of the array A1 is illustrated; however, a sub-unit 100a2 of the array A2 also has a configuration similar to that in FIG. 17, that is, has a configuration in a mirror image relationship with the configuration in FIG. 17.

As illustrated in FIG. 17, the second optical element 42A is joined to the posts 101c with the joint portions 50 interposed therebetween. Note that, though the posts 101c are provided on both sides in the Y-direction to the second optical element 42A, the posts 101c may be provided on only one side therein.

Then, shielding portions 101d3 are provided at positions separate in the X1-direction with respect to the joint portions 50. With such a configuration, the joint portions 50 included in the sub-units 100a of one of the arrays A1 and A2 may be suppressed from being irradiated with the leak light L1 from the sub-units 100a of the other of the arrays A1 and A2, whereby the joint portions 50 may be suppressed from being damaged. In accordance with the present embodiment, the shielding portion 101d3 may be achieved with a more compact configuration.

Figure 18:
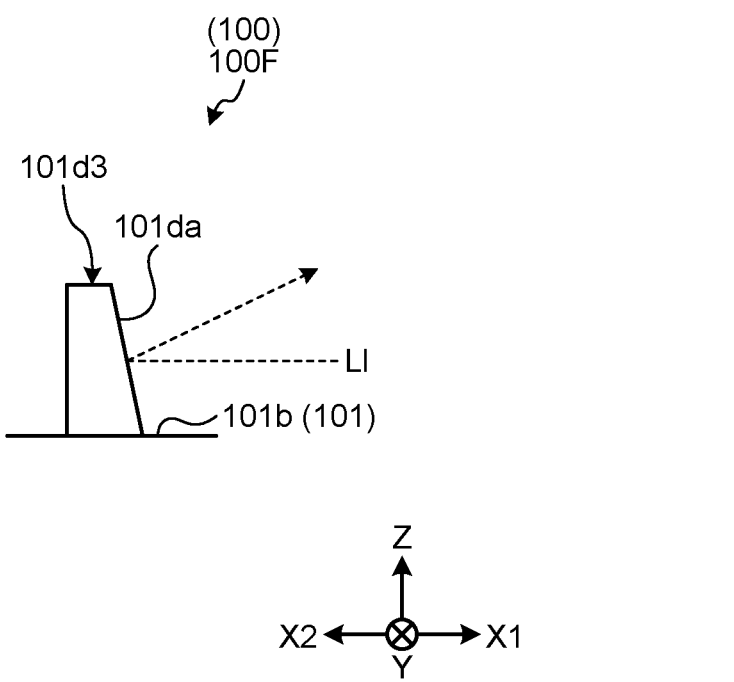
FIG. 18 is an illustrative and schematic side view of a shielding portion included in the light source unit of the ninth embodiment.

FIG. 18 is a side view of the shielding portion 101d3. As illustrated in FIG. 18, also in the present embodiment, the shielding portion 101d3 includes a reflecting surface 101da similar to that of the above-described seventh embodiment. A reflection direction of the leak light L1 by the reflecting surface 101da is similar to the above-described seventh embodiment. Thus, reflected light of the leak light L1 on the reflecting surfaces 101da may be suppressed from interfering with the laser light that is transferred in the sub-units 100a. Note that the shielding portion 101d3 may have a similar configuration to that of the eighth embodiment, and may function as an absorption portion.

Tenth Embodiment

Figure 19:
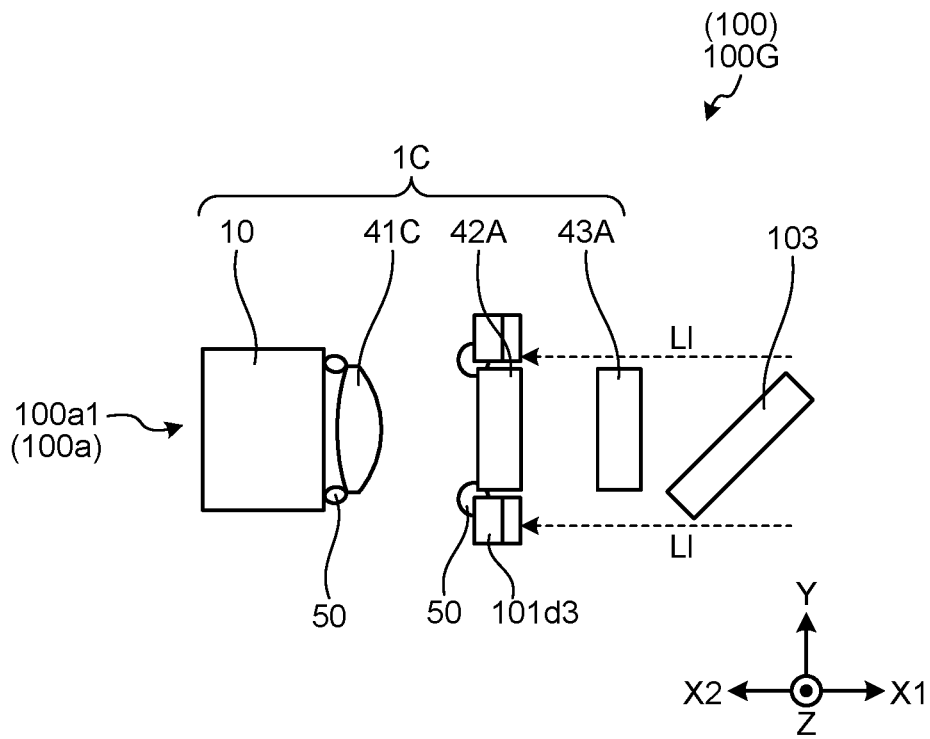
FIG. 19 is an illustrative and schematic plan view of a part of a light source unit of a tenth embodiment.

FIG. 19 is a plan view of a sub-unit 100a included in a light source unit 100G (100) of a tenth embodiment. Except for that the sub-unit 100a illustrated in FIG. 19 is provided in place of the sub-unit 100a illustrated in FIG. 14, the light source unit 100G includes a similar configuration to that of the light source unit 100D of the seventh embodiment. Note that, in FIG. 19, the sub-unit 100a1 of the array A1 is illustrated; however, a sub-unit 100a2 of the array A2 also has a configuration similar to that in FIG. 17, that is, has a configuration in a mirror image relationship with the configuration in FIG. 17.

As illustrated in FIG. 19, the second optical element 42A is joined to the shielding portion 101d3 with the joint portions 50 interposed therebetween. Moreover, the joint portions 50 are provided on an opposite side to the leak light with respect to the shielding portion 101d3. Hence, also in the present embodiment, the shielding portion 101d3 shields the leak light L1 directed to the joint portions 50. That is, it may be said that the shielding portion 101d3 is one in which the posts 101c and the shielding portion 101d3 in the configuration of the ninth embodiment are functionally integrated with each other. Also in the present embodiment, by the shielding portion 101d3, the joint portions 50 included in the sub-units 100a of one of the arrays A1 and A2 may be suppressed from being irradiated with the leak light L1 from the sub-units 100a of the other of the arrays A1 and A2, whereby the joint portions 50 may be suppressed from being damaged. In accordance with the present embodiment, such a configuration that may suppress the irradiation of the leak light L1 onto the joint portions 50 and may suppress the inclination of the second optical element 42A may be achieved by a simpler configuration.

Eleventh Embodiment

Configurations of Light Source Apparatus and Optical Fiber Laser

Figure 20:
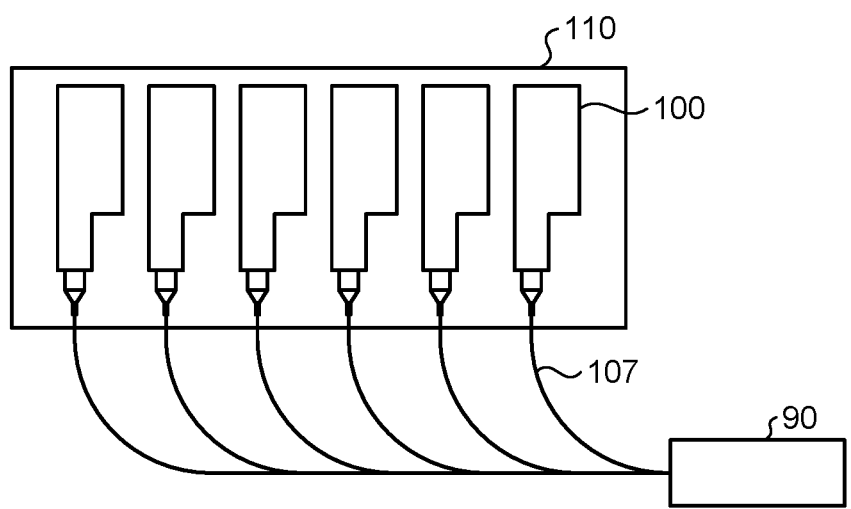
FIG. 20 is an illustrative configuration diagram of a light source apparatus of an eleventh embodiment.

FIG. 20 is a configuration diagram of a light source apparatus 110 of an eleventh embodiment, on which the light source units 100 of any of the above-described fourth to tenth embodiments are mounted. The light source apparatus 110 includes a plurality of the light source units 100 as pumping light sources. Pieces of light (laser light) emitted from the plurality of light source units 100 are propagated to a combiner 90 as an optical coupling unit via optical fibers 107. Output terminals of the optical fibers 107 are coupled to a plurality of input ports of the combiner 90 that has a plurality of inputs and a single output. Note that the light source apparatus 110 is not limited to one having the plurality of light source units 100, and just needs to include at least one light source unit 100.

Twelfth Embodiment

Figure 21:
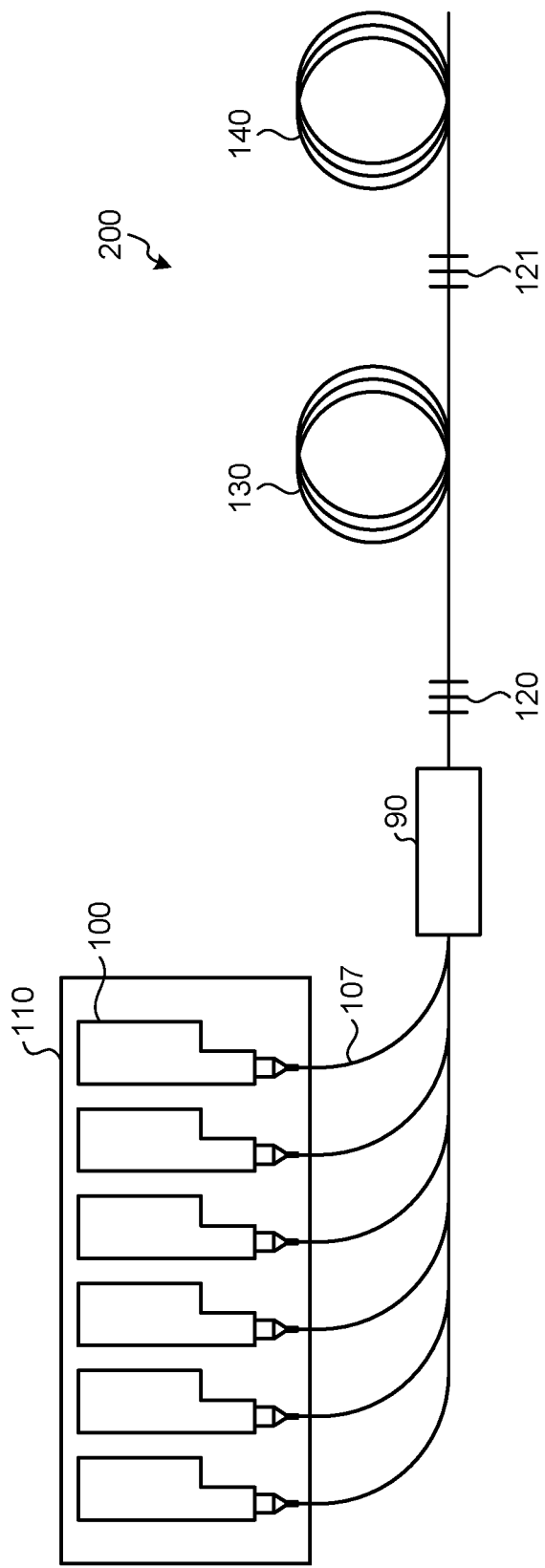
FIG. 21 is an illustrative configuration diagram of an optical fiber laser of a twelfth embodiment.

FIG. 21 is a configuration diagram of an optical fiber laser 200 on which the light source apparatus 110 of FIG. 20 is mounted. The optical fiber laser 200 includes the light source apparatus 110 and the combiner 90 which are illustrated in FIG. 20, a rare earth-doped optical fiber 130, and an output-side optical fiber 140. An input terminal and output terminal of the rare earth-doped optical fiber 130 are provided with high-reflection fiber brag gratings (FBRs) 120 and 121, respectively.

The input terminal of the rare earth-doped optical fiber 130 is connected to the output terminal of the combiner 90, and an input terminal of the output-side optical fiber 140 is connected to the output terminal of the rare earth-doped optical fiber 130. Note that, as such an incidence portion that makes incidence of the pieces of laser light, which are output from the plurality of light source units 100, onto the rare earth-doped optical fiber 130, another configuration may be used in place of the combiner 90. For example, such a configuration may be adopted, in which the optical fibers 107 of the output portions in the plurality of light source units 100 are arranged side by side, and the pieces of laser light output from the plurality of optical fibers 107 are made incident onto the input terminal of the rare earth-doped optical fiber 130 using an incidence portion such as an optical system including a lens. The rare earth-doped optical fiber 130 is an example of an optical amplifying fiber.

In accordance with the light source unit 100, the light source apparatus 110, and the optical fiber laser 200, which are mentioned above, the light emitting apparatus 1C and the light emitting apparatuses 1A and 1B are provided, whereby such an advantage that the width or optical diameter of the beam may be further reduced is obtained.

The embodiments have been illustrated above; however, the above-described embodiments are merely examples, and do not intend to limit the scope of the disclosure. The above-described embodiments may be embodied in other various forms, and varieties of omissions, substitutions, combinations, and alterations may be made within the scope without departing from the spirit of the disclosure. Moreover, specifications such as respective configurations, and shapes (the specifications including structures, types, directions, models, sizes, lengths, widths, heights, numbers, arrangements, positions, materials, and the like) may be appropriately changed and embodied.

For example, the first optical element, the second optical element, and the third optical element are not limited to those disclosed in the embodiments, and for example, may be other optical elements such as mirrors, prisms, or diffraction optical elements, which reflect, refract, or diffract light. Note that the diffraction optical element is one, for example, in which a plurality of diffraction gratings different in period are composited to be integrally constituted.

Moreover, the optical axis of the optical path from the light emitting element to the outlet of the third optical element does not have to be linear, and may be bent appropriately.

Moreover, the arrangement of the sub-units, the light emitting modules, the respective optical elements, the photosynthesis unit, the respective optical components, the protruding portions, the shielding portion, and the like is not limited to the above-described embodiments. Moreover, the traveling direction of the leak light is not limited to the above-mentioned direction.

In accordance with the present disclosure, the beam diameter may be further reduced in the configuration in which the light emitting element is housed in the case, and the lens that collimates the light emitted from the light emitting element is provided outside the case.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light emitting apparatus comprising:
a light emitting element having an emitting surface extending in a first direction, the light emitting element being configured to emit laser light and having a slow axis along the first direction and a fast axis along a second direction perpendicular to the first direction;
a case configured to house the light emitting element, the case including a window configured to allow transmittance of the laser light emitted from the light emitting element;
a first optical element provided outside the case and configured to converge, in a fast axis direction, the laser light passing through the window; and
a second optical element configured to collimate a laser light input via the first optical element, in the fast axis direction, in a state where a beam width in the fast axis direction is narrower than a beam width in the fast axis direction on an incident surface of the first optical element, the second optical element being located closer to the first optical element than a convergence point of the laser light in the fast axis direction by the first optical element.

2. The light emitting apparatus according to claim 1, wherein
the first optical element is a convex lens at least in the fast axis direction, and
the second optical element is a concave lens at least in the fast axis direction.

3. The light emitting apparatus according to claim 1, wherein the first optical element is a lens having a plane-symmetric shape with respect to a virtual center plane that intersects the fast axis direction of the laser light.

4. The light emitting apparatus according to claim 1, wherein the first optical element is a lens having an axisymmetric shape with respect to a central axis extending along an optical axis of the laser light.

5. The light emitting apparatus according to claim 1, further comprising a third optical element configured to collimate, in a slow axis direction, the laser light input via the first optical element.

6. The light emitting apparatus according to claim 5, wherein the third optical element is located between the first optical element and the second optical element.

7. The light emitting apparatus according to claim 1, further comprising a base including a surface that goes along an optical axis direction of the laser light, wherein
the first optical element and the second optical element are located on the surface, and
at least one of the first optical element and the second optical element is fixed to a protruding portion with a joint portion interposed therebetween, the protruding portion protruding from the surface.

8. The light emitting apparatus according to claim 7, wherein at least one of the first optical element and the second optical element is fixed to the protruding portion at each of a plurality of spots with the joint portion interposed therebetween.

9. The light emitting apparatus according to claim 7, wherein, in a direction along the optical axis, the joint portion is interposed between the protruding portion and at least one of the first optical element and the second optical element.

10. The light emitting apparatus according to claim 7, wherein, in a direction that intersects the optical axis, the joint portion is interposed between the protruding portion and at least one of the first optical element and the second optical element.

11. The light emitting apparatus according to claim 7, wherein the protruding portion is the light emitting element.

12. The light emitting apparatus according to claim 7, further comprising a shielding portion configured to shield leak light of the laser light, the leak light being directed to the joint portion.

13. The light emitting apparatus according to claim 12, wherein the shielding portion includes a reflecting portion configured to reflect the leak light to a direction out of a direction opposite to an incident direction of the leak light.

14. The light emitting apparatus according to claim 12, wherein the shielding portion includes an absorption portion configured to absorb energy of the leak light.

15. The light emitting apparatus according to claim 1, wherein the first optical element is fixed to the light emitting element.

16. The light emitting apparatus according to claim 1, wherein the case is hermetically sealed.

17. A light source unit comprising:
the light emitting apparatus according to claim 1; and
an optical component configured to guide the light emitted from the light emitting apparatus to an input portion of an optical fiber.

18. The light source unit according to claim 17, wherein the light source unit includes:
a first sub-unit including
the light emitting element configured to emit the laser light toward a first direction, and
the first optical element and the second optical element which allow transmission of the laser light from the light emitting element toward the first direction,
a second sub-unit located separately from the first sub-unit in the first direction, and including
the light emitting element configured to emit the laser light toward a direction opposite to the first direction, and
the first optical element and the second optical element which allow transmission of the laser light from the light emitting element toward the direction opposite to the first direction; and
a shielding portion configured to shield at least one leak light of leak light of the laser light from the first sub-unit and leak light of the laser light from the second sub-unit.

19. The light source unit according to claim 18, wherein the shielding portion is located between the first sub-unit and the second sub-unit.

20. A light source apparatus comprising the light source unit according to claim 17.

21. An optical fiber laser comprising:
the light source apparatus according to claim 20; and
an optical amplifying fiber configured to amplify the laser light emitted from the light source apparatus.

* * * * *